US012675643B2

(12) United States Patent
Singh et al.

(10) Patent No.: US 12,675,643 B2
(45) Date of Patent: Jul. 7, 2026

(54) SYSTEM AND METHOD OF BREADTH-FIRST KEYWORD SENSITIVE SEMANTIC SEARCH SCORING FOR HIERARCHICALLY RELATED ARTIFICIAL INTELLIGENCE PRODUCTIVITY TOOL-ENABLABLE APPLICATION CAPABILITIES FOR A QUERY INPUT AT AN INFORMATION HANDLING SYSTEM

(71) Applicant: Dell Products LP, Round Rock, TX (US)

(72) Inventors: Ashutosh Singh, Austin, TX (US); Daniel Felbah, Toledo, OH (US); Mona Sachdev, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 181 days.

(21) Appl. No.: 18/789,226

(22) Filed: Jul. 30, 2024

(65) Prior Publication Data

US 2026/0037237 A1      Feb. 5, 2026

(51) Int. Cl.
| | |
|---|---|
| *G06F 40/35* | (2020.01) |
| *G06F 8/36* | (2018.01) |
| *G06F 16/3332* | (2025.01) |
| *G06F 16/334* | (2025.01) |
| *G06F 40/289* | (2020.01) |

(52) U.S. Cl.
CPC .............. *G06F 40/35* (2020.01); *G06F 8/36* (2013.01); *G06F 16/3334* (2019.01); *G06F 16/3344* (2019.01); *G06F 40/289* (2020.01)

(58) Field of Classification Search
None
See application file for complete search history.

(56) References Cited

U.S. PATENT DOCUMENTS

| | | | |
|---|---|---|---|
| 8,380,714 | B2 | 2/2013 | Inagaki |
| 8,548,951 | B2 | 10/2013 | Solmer |
| 9,201,957 | B2 | 12/2015 | Turdakov |
| 9,218,412 | B2 | 12/2015 | Wang |

(Continued)

FOREIGN PATENT DOCUMENTS

WO        2020/192587 A1        10/2020

*Primary Examiner* — Douglas Godbold
(74) *Attorney, Agent, or Firm* — Prol Intellectual Property Law, PLLC; H. Kenneth Prol

(57)        ABSTRACT

An information handling system for an on-the-box artificial intelligence productivity tool may comprise a memory storing descriptions of capabilities associated with software applications in a decision tree with each capability and a generated capability intent value stored as a capability node grouped under one of several branches in parent-child relationships, and a hardware processor executing machine readable code instructions to generate a query input intent value from a user query input requesting action by one of the software applications, comparing the capability intent values of each of the capability nodes in the decision tree, as weighted by a lexical comparison between the user query input and each of the descriptions of capabilities to conduct a breadth-first search to identify a best match childless capability node having a highest lexical weighted cosine semantic similarity search score, and executing the associated best match capability from the best match childless capability node.

20 Claims, 8 Drawing Sheets

(56) References Cited

U.S. PATENT DOCUMENTS

| | | | |
|---|---|---|---|
| 9,626,358 B2 | 4/2017 | Danielyan | |
| 9,633,085 B2 | 4/2017 | Kamotsky | |
| 9,648,683 B2 | 5/2017 | Kangyo | |
| 10,146,593 B2 | 12/2018 | Gong | |
| 10,249,207 B2 * | 4/2019 | Solomon | G09B 7/04 |
| 11,392,651 B1 * | 7/2022 | McClusky | G06F 16/338 |
| 11,501,177 B2 * | 11/2022 | Wang | G06N 5/022 |
| 11,620,262 B2 | 4/2023 | Lee | |
| 11,948,073 B2 | 4/2024 | Zhang | |
| 12,292,940 B2 * | 5/2025 | Meyer | G06F 40/221 |
| 2012/0303356 A1 * | 11/2012 | Boyle | G06F 40/30 |
| | | | 707/765 |
| 2018/0075131 A1 * | 3/2018 | Van Hoof | G06F 16/2471 |
| 2018/0365065 A1 | 12/2018 | Guttman | |
| 2019/0163818 A1 * | 5/2019 | Mittal | G06F 40/30 |
| 2020/0387550 A1 | 12/2020 | Cappetta | |
| 2020/0394360 A1 | 12/2020 | Dunn | |
| 2021/0216576 A1 | 7/2021 | Staub | |
| 2021/0256207 A1 | 8/2021 | Dunn | |
| 2021/0334194 A1 | 10/2021 | Xiao | |
| 2021/0366506 A1 | 11/2021 | Han | |
| 2021/0374353 A1 | 12/2021 | Zhang | |
| 2022/0035684 A1 | 2/2022 | Gupte | |
| 2022/0035732 A1 | 2/2022 | Xiao | |
| 2022/0092439 A1 | 3/2022 | Liu | |
| 2022/0222281 A1 * | 7/2022 | Eom | G06F 16/334 |
| 2022/0318502 A1 | 10/2022 | Howell | |
| 2023/0105806 A1 | 4/2023 | Dunn | |
| 2023/0214593 A1 * | 7/2023 | Padukone | G06N 3/08 |
| | | | 704/2 |
| 2023/0222359 A1 | 7/2023 | Panikkar | |
| 2023/0237263 A1 | 7/2023 | Howell | |
| 2023/0251962 A1 | 8/2023 | Xiao | |
| 2024/0054318 A1 | 2/2024 | Feltin | |
| 2024/0061719 A1 | 2/2024 | Reddy | |
| 2024/0069770 A1 | 2/2024 | Prabhakar | |
| 2024/0069959 A1 | 2/2024 | Prabhakar | |
| 2024/0070113 A1 | 2/2024 | Prabhakar | |
| 2024/0143681 A1 * | 5/2024 | Meyer | G06Q 10/10 |
| 2024/0161003 A1 | 5/2024 | Alexander | |
| 2024/0296181 A1 * | 9/2024 | Busany | G06F 16/367 |
| 2026/0029999 A1 * | 1/2026 | Bieck | G06F 8/36 |

* cited by examiner

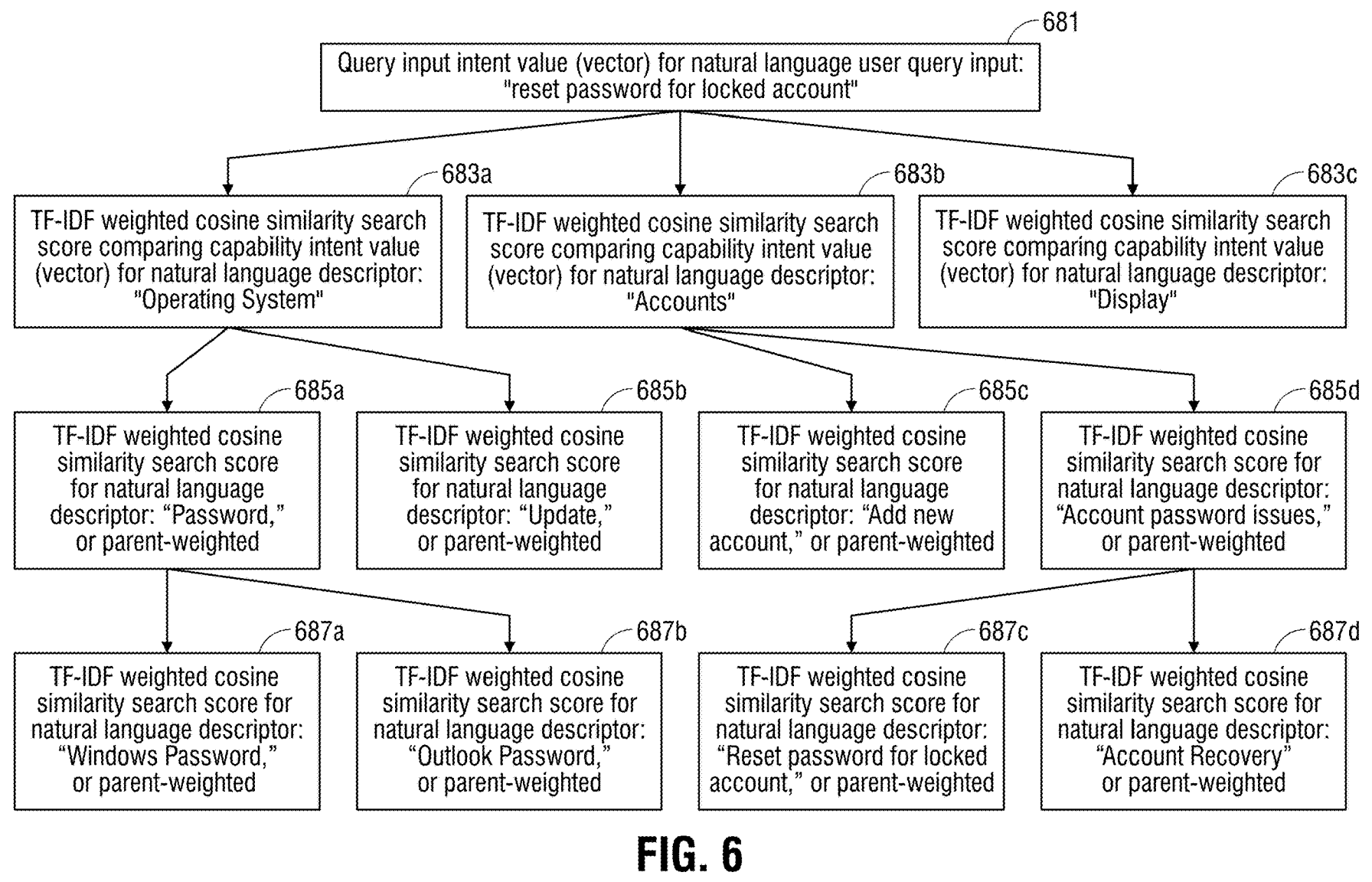

681 — Query input intent value (vector) for natural language user query input: "reset password for locked account"

683a — TF-IDF weighted cosine similarity search score comparing capability intent value (vector) for natural language descriptor: "Operating System"

683b — TF-IDF weighted cosine similarity search score comparing capability intent value (vector) for natural language descriptor: "Accounts"

683c — TF-IDF weighted cosine similarity search score comparing capability intent value (vector) for natural language descriptor: "Display"

685a — TF-IDF weighted cosine similarity search score for natural language descriptor: "Password," or parent-weighted 685b — TF-IDF weighted cosine similarity search score for natural language descriptor: "Update," or parent-weighted 685c — TF-IDF weighted cosine similarity search score for natural language descriptor: "Add new account," or parent-weighted 685d — TF-IDF weighted cosine similarity search score for natural language descriptor: "Account password issues," or parent-weighted 687a — TF-IDF weighted cosine similarity search score for natural language descriptor: "Windows Password," or parent-weighted 687b — TF-IDF weighted cosine similarity search score for natural language descriptor: "Outlook Password," or parent-weighted 687c — TF-IDF weighted cosine similarity search score for natural language descriptor: "Reset password for locked account," or parent-weighted 687d — TF-IDF weighted cosine similarity search score for natural language descriptor: "Account Recovery" or parent-weighted

FIG. 6

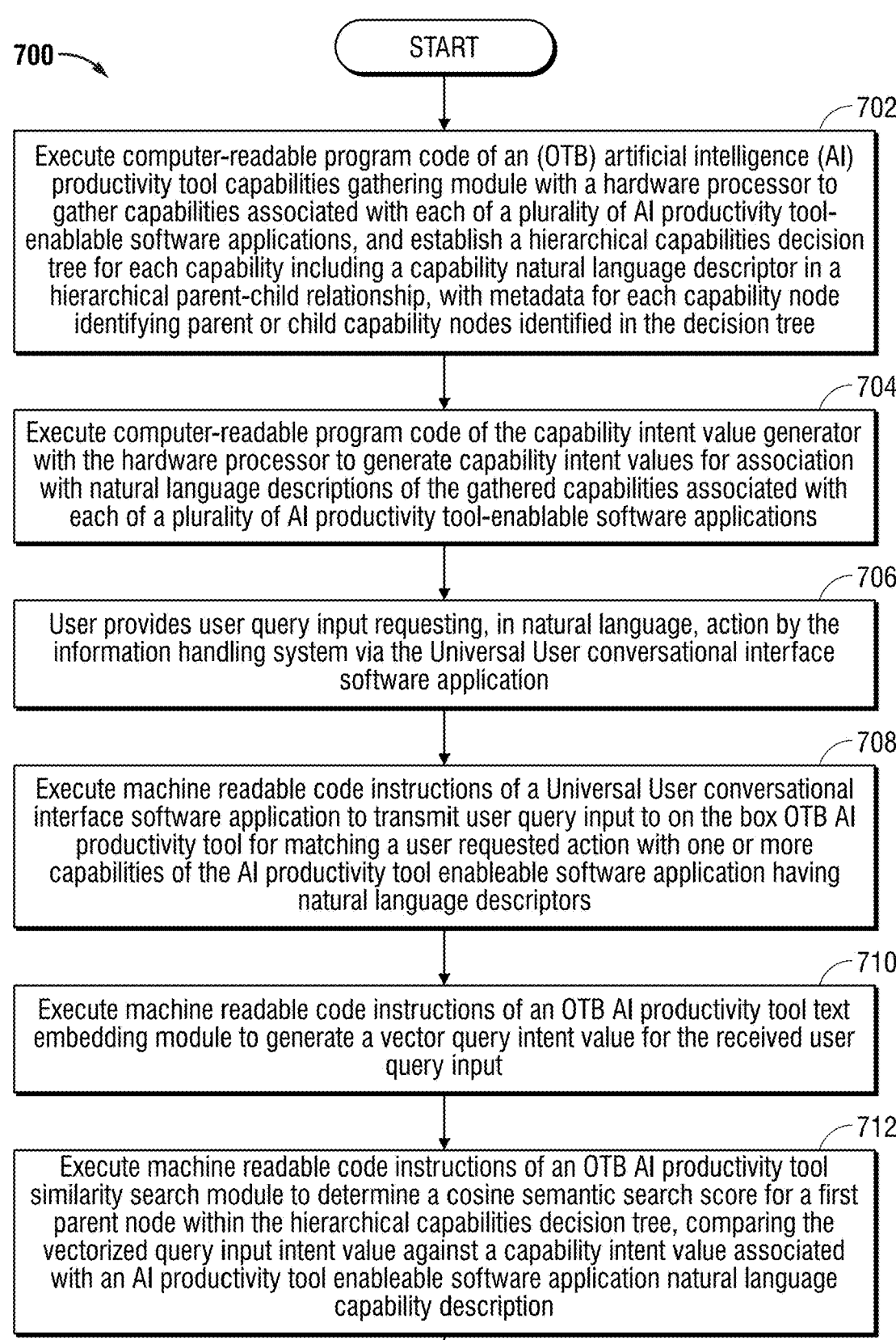

700

START

702

Execute computer-readable program code of an (OTB) artificial intelligence (AI) productivity tool capabilities gathering module with a hardware processor to gather capabilities associated with each of a plurality of AI productivity tool-enablable software applications, and establish a hierarchical capabilities decision tree for each capability including a capability natural language descriptor in a hierarchical parent-child relationship, with metadata for each capability node identifying parent or child capability nodes identified in the decision tree

704

Execute computer-readable program code of the capability intent value generator with the hardware processor to generate capability intent values for association with natural language descriptions of the gathered capabilities associated with each of a plurality of AI productivity tool-enablable software applications

706

User provides user query input requesting, in natural language, action by the information handling system via the Universal User conversational interface software application

708

Execute machine readable code instructions of a Universal User conversational interface software application to transmit user query input to on the box OTB AI productivity tool for matching a user requested action with one or more capabilities of the AI productivity tool enableable software application having natural language descriptors

710

Execute machine readable code instructions of an OTB AI productivity tool text embedding module to generate a vector query intent value for the received user query input

712

Execute machine readable code instructions of an OTB AI productivity tool similarity search module to determine a cosine semantic search score for a first parent node within the hierarchical capabilities decision tree, comparing the vectorized query input intent value against a capability intent value associated with an AI productivity tool enableable software application natural language capability description

SYSTEM AND METHOD OF BREADTH-FIRST KEYWORD SENSITIVE SEMANTIC SEARCH SCORING FOR HIERARCHICALLY RELATED ARTIFICIAL INTELLIGENCE PRODUCTIVITY TOOL-ENABLABLE APPLICATION CAPABILITIES FOR A QUERY INPUT AT AN INFORMATION HANDLING SYSTEM

FIELD OF THE DISCLOSURE

The present disclosure generally relates to execution of computer readable code instructions of artificial intelligence (AI) productivity tools with an information handling system. The present disclosure more specifically relates systems and methods of identifying an artificial intelligence productivity tool-enableable software application capability that is a best match for an action requested by a user within a received user query input using a breadth-first, comprehensive keyword sensitive semantic similarity search, including a text frequency-inverse document frequency (TF-IDF) weighted semantic similarity search across a plurality of such capabilities having hierarchical parent-child relationships to one another.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more5computer systems, data storage systems, and networking systems. The information handling system may include telecommunication, network communication, and video communication capabilities. The information handling system may be used to execute instructions of one or more software applications such as workspace productivity applications, or gaming applications or the like. Further, the information handling system may include AI productivity tools that interface with various AI productivity tool-enablable software applications such as natural language chat-enabled environments for interface with services of software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6 is a block diagram illustrating a method of executing computer readable code instructions to identify a capability that best matches a received user query input by having a highest TF-IDF weighted cosine similarity search score across all childless capability nodes of the hierarchical capabilities decision tree according to an embodiment of the present disclosure.

The use of the same reference symbols in different drawings may indicate similar or identical items.

DETAILED DESCRIPTION OF THE DRAWINGS

Figure 1:
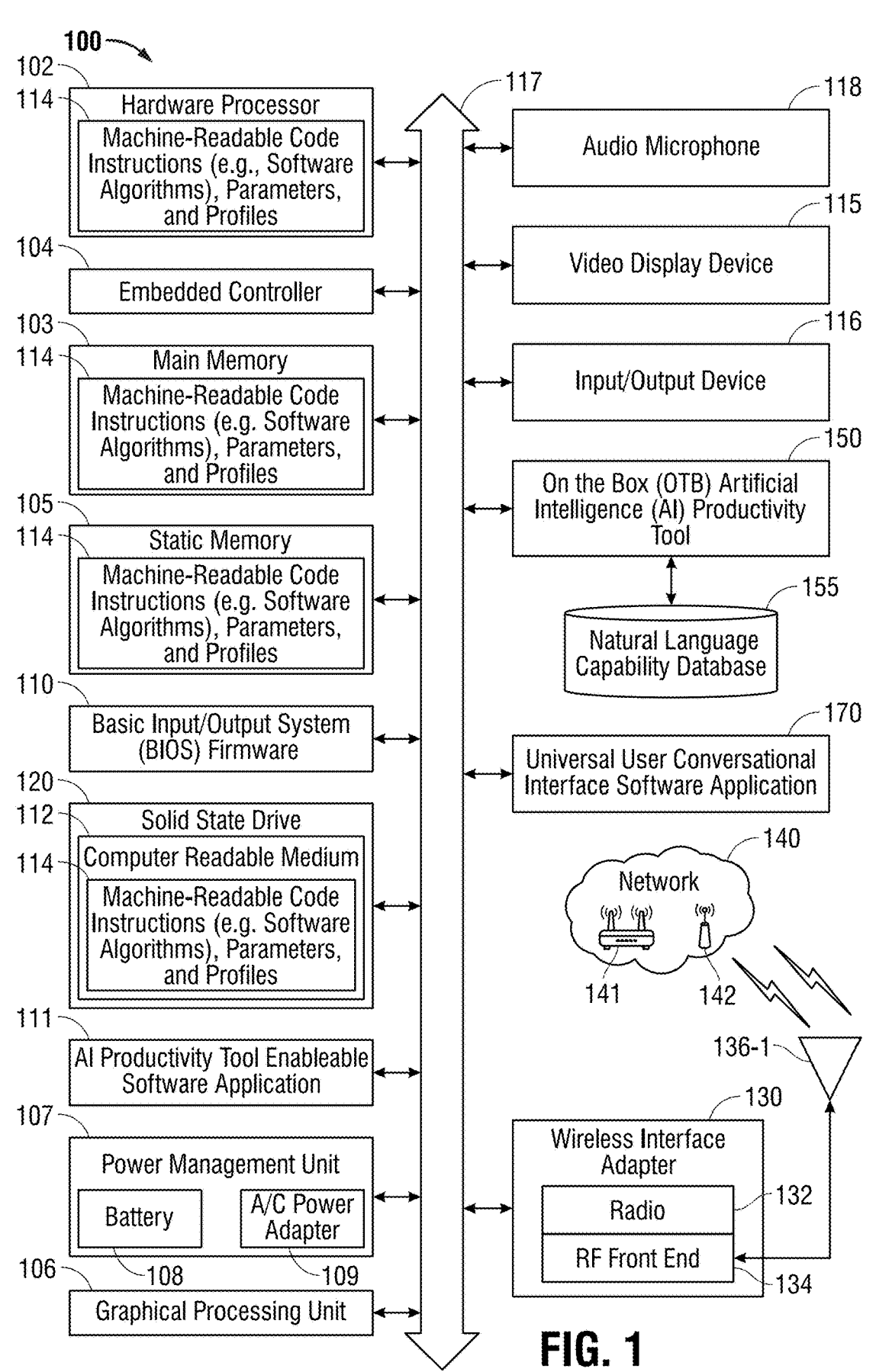
FIG. 1 is a block diagram illustrating an information handling system that includes an on the box (OTB) artificial intelligence (AI) productivity tool to select among a plurality of AI productivity tool-enablable software application capabilities for services, operations, or responses to a user query input according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on-the-box (OTB) AI productivity tool that receives this voice or text input from a user and implements a number of actions or utilizes services of various software applications based on the natural language of the user query input. In some information handling systems, the OTB AI productivity tool may interface with various AI productivity tool-enablable software applications being executed or executable on the information handling system. These AI productivity tool-enablable software applications may integrate with the OTB AI productivity tool to allow user queries to trigger certain actions declared, supported, and managed by these AI productivity tool-enablable software applications.

A hardware processor executing code instructions of the OTB AI productivity tool in embodiments herein may match these received user queries, or user query inputs, to known capabilities of one or more of the AI productivity tool-enableable software applications through execution by a hardware processor of machine readable code instructions for one or more natural language processing machine learning models. This process includes gathering, either in real-time or prior to execution of the OTB AI productivity tool, capabilities associated with each of a plurality of AI productivity tool-enablable software applications. These capabilities (also called capability intents and having capability intent values generated from the natural language descriptions) may describe those functionalities of each of the AI productivity tool-enablable software applications that may be used when interfacing with the OTB AI productivity tool. These natural language descriptions and other data of the capabilities for the AI productivity tool-enableable software applications may be stored within a natural language capability database for comparison to received user query inputs, for example, in order to identify a capability most likely to address a user's request within the received user query inputs.

The natural language descriptions of capabilities for the AI productivity tool enableable software applications in an embodiment may be organized into a hierarchical capabilities decision tree that maps logical parent-child relationships between and among the plurality of natural language descriptions of the capabilities in embodiments of the present disclosure. Each capability node of this hierarchical capabilities decision tree in embodiments herein may have the same data fields, including a capability name, capability identification (ID) (e.g., in alphanumeric values), and a natural language description of the capability. In some embodiments, each capability node may further include a capability intent value, or one or more keywords within the capability natural language description. The hierarchical capabilities decision tree in embodiments herein may identify child capability natural language descriptions or phrases therewithin as providing greater specificity than its identified parent capability natural language description or phrases. For example, a parent capability natural language description phrase such as "passwords" may have two child capability natural language description phrases, including "Microsoft password," and "Outlook password," each providing a more specific example of the parent phrase "password."

Capability nodes for parent capability natural language descriptions or phrases may be separated from children capability nodes having natural language descriptions or phrases within the hierarchical capabilities decision tree in embodiments herein by branches. Each level of the hierarchical capabilities decision tree may thus include one or more capability nodes identified as a child, and connected via a branch to one of the capability nodes in the previous level of the hierarchical capabilities decision tree. Each capability natural language description or phrase identified as a child capability node in such a way within the hierarchical capabilities decision tree may include an identification of its parent capability node or parent capability natural language description/phrase.

A hardware processor executing machine readable code instructions for a capability intent value generator of the OTB AI productivity tool may determine capability intent values associated with these natural language descriptions of the gathered capabilities for each of a plurality of AI productivity tool-enablable software applications. These capability intent values are a mathematical representation of capability operations or services from various AI productivity tool-enablable software applications in embodiments herein. These capability intent values may be represented by a mathematical value in a multi-axis vector space that may be associated with a natural language description for that capability or its intent. Generating such capability intent values as vectors may be a first step in a natural language processing method to determine and correlate the user's query intent or requested action within a user query input that takes into account the context or semantics of the words used within the user query input with one of a plurality of capabilities. In an embodiment, the capabilities may be associated with an identification (ID) such as an alphanumeric ID that also may be stored within a natural language capability database.

Upon receipt of a user query input by the OTB AI productivity tool in embodiments herein, a hardware processor executing code instructions of a query intent determination module may determine a vectorized query input intent value for the user query input that may be comparable to the capability intent values. The hardware processor executing machine readable code instructions for a query intent to capability determination module in embodiments herein may then perform one or more similarity search methods to match the query input intent value with a capability intent value in order to identify a capability for an AI productivity tool-enableable software application that most closely corresponds and can address the user request within the user query input. One methodology for matching text or documents may center upon keyword or lexical searches, such as term frequency-inverse document frequency (TF-IDF) searches. TF-IDF searches may conduct a lexical comparison in this context focus upon the frequency of a term or keyword found within a user query input and within natural language descriptions of known capabilities for the AI productivity tool enableable software applications. TF-IDF or other lexical algorithms lack the ability to determine context of the various keywords identified within the user query input, however. For example, TF-IDF or other lexical algorithms cannot discern between different meanings for the same word or identify synonyms for keywords, which people routinely employ in natural language conversation or relation to other words in a phrase. This may result in limits for matching between natural language text excerpts, such as the user query input and the software service or function described in a natural language capability for an AI productivity tool-enableable software application.

In embodiments herein, a hardware processor may execute machine readable code instructions for a semantic similarity search machine learning model that analyzes and weighs context and relevancy to overcome this disadvantage of TF-IDF algorithms. For example, in embodiments herein, a hardware processor may execute machine readable code instructions for a semantic similarity search machine learning model, via a query intent to capability module, that compares the vectorized user query input intent value and the capability intent values stored within the natural language capability database. Such a comparison may be performed using a semantic search machine learning model, such as a cosine similarity search that compares the distance or value difference in a multi-axis vector space between two vectors (e.g., the capability intent value vector and the user query input value vector) to determine the contextual similarity or correlation between the natural language description of the capability and the natural language user query input. Such a contextual or semantic search methodology may take into account the fact that the same word may have two meanings or consider synonyms of words or context within phrases, for example. This may be performed for several of the capability intent values stored within the capability intent value database to identify a capability intent value that most closely matches the user query input value. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

While semantic search algorithms are better-suited for use with natural language text excerpts than TF-IDF algorithms that do not consider context, TF-IDF algorithms are better-suited than semantic search algorithms where a single keyword within the user query input is most important to identifying a matching capability for an AI productivity tool-enableable software application to address the user's concerns. For example, a user may provide a natural language user query input such as "resolve error code 0xc0000142." In such a scenario the semantic search algorithms may identify that an error code needs to be resolved, but it may not focus heavily on the term "0xc0000142," which may be critical to finding the right AI productivity tool enableable software application to resolve the error code. In such a case, it may be useful to also perform a TF-IDF comparison across the stored natural language descriptions of the capabilities within the natural language capabilities database to identify the capability that best addresses the specific term "0xc0000142," according to embodiments herein.

Several different methods exist for traversing a hierarchical capabilities decision tree to determine a cosine semantic similarity score or TF-IDF score for each node within the tree. In some cases, a depth-first search may be used, which analyzes all of the nodes within a vertical lineage of parent-child relationships down to a single child node. For example, the vectorized user query input intent value and each of several capability intent values, each associated with a single node may be compared using a semantic search approach, such as a cosine similarity search or comparison. Thus, a single user query input may be compared to a plurality of natural language capabilities for AI productivity tool enableable software applications, with each node of the hierarchical capabilities decision tree representing a capability.

More specifically, for each natural language capability at a first level of the hierarchical capabilities decision tree, a TF-IDF weighted cosine semantic similarity search score could be determined that compares the vectorized user query input intent value and the capability intent values for the natural language descriptions of the capabilities at the first level. A parent best match capability having a highest TF-IDF weighted cosine semantic similarity search score among the natural language capabilities at the first level of the hierarchical capabilities decision tree could then be identified. In a depth-first tree-traversal methodology a TF-IDF weighted cosine semantic similarity search score only for the children of the capability natural language description identified as the parent best match capability for the previous level of the hierarchical capabilities decision tree may then be later considered as a candidate best match capability to address the user's request within the received user query input. Comparison of TF-IDF weighted cosine semantic similarity search scores in such a depth-first approach may be limited at each level of the hierarchical capabilities decision tree to children capability nodes of the natural language description of the capability node at the previous level having a capability intent value generating a highest TF-IDF weighted cosine semantic similarity search score. This depth-first tree-traversal methodology may consistently narrow the focus of comparisons between the query input intent value and the plurality of capability intent values to natural language descriptions of increasing specificity. As a consequence, there is a risk that the range of capabilities considered as candidates for fulfilling the user's request within the received user query input may narrow too quickly, or become too specific too quickly. In other words, the depth-first tree-traversal methodology may increase computing speed at the expense of accuracy in determining the best possible match across all capabilities of the hierarchical capabilities decision tree by narrowing focus to a particular parent-child lineage of the hierarchical capabilities decision tree too early in the process of traversing the hierarchical capabilities decision tree.

Embodiments of the present disclosure overcome this issue by using a breadth-first tree-traversal methodology, rather than a depth-first tree-traversal methodology to comprehensively consider a wider array of capability nodes within the hierarchical capabilities decision tree as a candidate for a best match capability for meeting the user's request within the received user query input. The hardware processor executing machine readable code instructions of the query intent to capability determination module in embodiments herein may perform such a breadth-first tree-traversal methodology by determining a TF-IDF weighted cosine semantic similarity search score for each node within a highest level of the hierarchical capabilities decision tree. Upon making such a determination for each node of the highest level, the hardware processor executing machine readable code instructions of the query intent to capability determination module in embodiments herein may then determine a TF-IDF weighted cosine semantic similarity search score for each node within the next-highest level of the hierarchical capabilities decision tree. This approach may continue for each of the levels of the hierarchical capabilities decision tree until the hardware processor executing machine readable code instructions of the query intent to capability determination module in embodiments herein has determined a TF-IDF weighted cosine semantic similarity search score for the capability nodes within the hierarchical capabilities decision tree, thus providing a comprehensive scoring for a wider range of capabilities represented within the hierarchical capabilities decision tree.

In some embodiments, every capability node within the hierarchical capabilities decision tree has a determined TF-IDF weighted cosine semantic similarity search score. In other embodiments, branches at a first level or later levels of the hierarchical capabilities decision tree having a very low correlating TF-IDF weighted cosine semantic similarity search score may be eliminated before proceeding to the next lower level. The hardware processor executing machine readable code instructions of the query intent to capability determination module in embodiments herein may then identify a best match capability associated with a childless capability node, or a capability node at a bottom branch of the hierarchical capabilities decision tree having a highest TF-IDF weighted cosine semantic similarity search score in comparison to only other childless capability nodes within the hierarchical capabilities decision tree along branches assessed.

In such a way, the hardware processor executing code instructions for the query intent to capability module for the OTB AI productivity tool may overcome or lessen the impacts of overly narrow focus on particular lineages of the hierarchical capabilities decision tree encountered by a depth-first tree-traversal methodology, and may enhance semantic search performance by also considering critical keywords when determining a matching capability of an AI productivity tool enableable software application that is most likely to address the user's intent within the user query input.

Turning now to the figures, FIG. 1 illustrates an information handling system 100 similar to the information handling systems according to several aspects of the present disclosure. As described herein, hardware processor 102 executing machine-readable code instructions of an-on the-box (OTB) artificial intelligence (AI) productivity tool 150 in an embodiment may perform one or more semantic similarity search methods to match a received query and query input intent value with a capability intent value and capability in order to identify a capability for an AI productivity tool-enableable software application 111 that can address the user request within the user query input. A text frequency-inverse document frequency (TF-IDF) keyword comparison may also be performed to enhance semantic search performance by also considering critical keywords when determining a matching capability of an AI productivity tool enableable software application that is most likely to address the user's intent within the user query input. The OTB AI productivity tool 150 in an embodiment may receive, via a universal user conversational interface software application 170 or other audio or text interface, a voice or text input from a user, described herein as a user query input, that requests actions or services of various software applications in natural language. The hardware processor 102 may execute machine readable code instructions for a semantic similarity search machine learning model that analyzes and weighs context and relevancy of the natural language within the user query input to identify a registered capability, also provided in natural language description, for an AI productivity tool enableable software application 111 that may perform the action or service requested within the user query input.

In an embodiment, the hardware processor 102 executing machine readable code instructions for the OTB AI productivity tool 150 may similarity match or correlate received user queries, or user query inputs to known capabilities of one or more of the AI productivity tool-enableable software applications, such as 111 by comparing natural language descriptions of the known capabilities to the natural language text of the user query input. This process in an embodiment may include gathering, either in real-time or prior to execution of the OTB AI productivity tool 150, capabilities associated with each of a plurality of AI productivity tool-enablable software applications 111 and describing in natural language functionalities of each of the AI productivity tool-enablable software applications that may be used when interfacing with the OTB AI productivity tool 150.

The natural language descriptions of capabilities for the AI productivity tool enableable software applications 111 stored in the natural language capabilities database 155 in an embodiment may be organized into a hierarchical capabilities decision tree, also stored at the natural language capabilities database 155, that maps logical parent-child relationships between and among the plurality of natural language descriptions as capability nodes in embodiment herein. Each capability node of this hierarchical capabilities decision tree may include a capability name, capability identification (ID) (e.g., in alphanumeric values), and a natural language description of the capability. In some embodiments, each capability node may further include a capability intent value, or one or more keywords within the capability natural language description as well as other data or metadata for the capability. The hierarchical capabilities decision tree in an embodiment may identify child capability natural language descriptions or phrases therewithin as providing greater specificity than its identified parent capability natural language description or phrases. For example, a parent capability natural language description phrase such as "passwords" may have two child capability natural language description phrases, including "Microsoft password," and "Outlook password," each providing a more specific example of the parent phrase "password."

Capability nodes of parent capability natural language descriptions or phrases may be separated from children capability node natural language descriptions or phrases within the hierarchical capabilities decision tree by branches. Each level of the hierarchical capabilities decision tree may thus include one or more capability nodes identified as a child, and connected via a branch to one of the capability nodes in the previous level of the hierarchical capabilities decision tree. The connection may be identified in a metadata or other data value linking the stored child capability node data with the parent capability node data within the natural language capability database 155. Each capability natural language description or phrase identified as a child capability node in such a way within the hierarchical capabilities decision tree may include an identification of its parent capability node or parent capability natural language description/phrase.

The hardware processor 102 executing machine readable code instructions of the OTB AI productivity tool 150 may determine capability intent values associated with natural language descriptions of the gathered capabilities for each of a plurality of AI productivity tool-enablable software applications, such as 111. These capability intent values are a mathematical representation of descriptors of the capability operations or services from various AI productivity tool-enablable software applications and may be represented by a mathematical value that is an embedded capability intent value in a multi-axis vector space that may be associated with a natural language description for that capability or intent. The hardware processor 102 may execute machine readable code instructions of the OTB AI productivity tool 150 to perform a cosine similarity search or comparison that compares a vectorized user query input intent value and vectorized capability intent values to determine the contextual similarity between the natural language description of the capability and the natural language user query input. This may be performed for several of the capability intent values to identify a capability intent value that most closely matches or correlates with the user query input value. In such a way, the hardware processor 102 executing code instructions for the OTB AI productivity tool 150 may take relevance and context of natural language within a user query input into account when determining a matching or correlating capability of an AI productivity tool enableable software application 111 that is most likely to address the user's intent within the user query input.

In order to increase the accuracy of the above-described semantic search or comparison results, such as the cosine semantic similarity algorithm, the hardware processor 102 executing machine readable code instructions for the OTB AI productivity tool 150 in an embodiment may, for each compared user query input and natural language capability, also perform a TF-IDF comparison. The output of the semantic search comparison may then be weighted by the TF-IDF comparison for each natural language capability compared to the user query input, via the hardware processor 102 executing machine readable code instructions of OTB AI productivity tool 150. In such a way, the hardware processor 102 executing code instructions for the OTB AI productivity tool 150 may enhance semantic search performance by also considering important keywords when determining a matching capability of an AI productivity tool enableable software application 111 that is most likely to address the user's intent within the user query input.

Several different methods exist for traversing a hierarchical tree, such as the hierarchical capabilities decision tree, to determine a cosine semantic similarity score or TF-IDF score for each node within the tree. In some cases, a depth-first search may be used, which analyzes all of the capability nodes within a vertical lineage of parent-child relationships down to a single child node. For example, the vectorized user query input intent value and each of several capability intent values, each associated with a single capability node may be compared using a semantic search approach, such as a cosine similarity search or comparison. Thus, a single user query input may be compared to a plurality of natural language capabilities for AI productivity tool enableable software applications, with each capability node of the hierarchical capabilities decision tree representing a capability.

More specifically, in a depth-first approach, for each natural language capability at a first level of the hierarchical capabilities decision tree, a TF-IDF weighted cosine semantic similarity search score could be determined that compares the vectorized user query input intent value and the capability intent values for the natural language descriptions of the capabilities at the first level. A parent best match capability having a highest TF-IDF weighted cosine semantic similarity search score among the natural language capabilities at the first level of the hierarchical capabilities decision tree could then be identified. In a depth-first tree-traversal methodology a TF-IDF weighted cosine semantic similarity search score only of a branch for the children capability nodes of the capability natural language description identified as the parent best match capability node for the previous level of the hierarchical capabilities decision tree may then be later considered as a candidate best match capability to address the user's request within the received user query input. Comparison of TF-IDF weighted cosine semantic similarity search scores in such a depth-first approach may be limited at each level of the hierarchical capabilities decision tree to a branch of children capability nodes for the natural language description of the capability at the previous level having a capability intent value generating a highest TF-IDF weighted cosine semantic similarity search score.

This depth-first tree-traversal methodology may consistently narrow the focus of comparisons between the query input intent value and the plurality of capability intent values to natural language descriptions of increasing specificity. As a consequence, there is a risk that the range of capabilities considered as candidates for fulfilling the user's request within the received user query input may narrow too quickly, or become too specific too quickly. In other words, the depth-first tree-traversal methodology may increase computing speed at the expense of accuracy in determining the best possible match across all capabilities of the hierarchical capabilities decision tree by narrowing focus to a particular parent-child lineage of the hierarchical capabilities decision tree too early in the process of traversing the hierarchical capabilities decision tree. However, this focus to eliminate branches may be useful when parent capability nodes have a very low correlation of TF-IDF weighted cosine semantic similarity search score and, in some embodiments, this approach may be applied to limit branches of the hierarchical capabilities decision tree.

Embodiments of the present disclosure overcome the concern of over-focusing too early and missing candidate capability nodes by using a breadth-first tree-traversal methodology, rather than a depth-first tree-traversal methodology to comprehensively consider every node within the hierarchical capabilities decision tree as a candidate for a best match capability for meeting the user's request within the received user query input. In some embodiments, a hybrid depth-first tree-traversal methodology may be used as well to eliminate very low correlating parent capability nodes as described. However, the hardware processor 102 executing machine readable code instructions of the OTB AI productivity tool 150 in an embodiment may perform such a breadth-first tree-traversal methodology by determining a TF-IDF weighted cosine semantic similarity search score for each node within a highest level of the hierarchical capabilities decision tree. Upon making such a determination for each node of the highest level, the hardware processor 102 executing machine readable code instructions of the OTB AI productivity tool 150 in an embodiment may then determine a TF-IDF weighted cosine semantic similarity search score for each node within the next-highest level of the hierarchical capabilities decision tree. This approach may continue for each of the levels of the hierarchical capabilities decision tree until the hardware processor 102 executing machine readable code instructions of the OTB AI productivity tool 150 in an embodiment has determined a TF-IDF weighted cosine semantic similarity search score for every node within the hierarchical capabilities decision tree or for those branches not eliminated at a parent capability node have a very low correlating TF-IDF weighted cosine semantic similarity search score.

Thus, execution of code instructions for a TF-IDF weighted semantic similarity search provides a comprehensive scoring for every capability node or at least capability nodes for those branches with a parent capability node having a correlating TF-IDF weighted cosine semantic similarity search score above a threshold level within the hierarchical capabilities decision tree. The hardware processor 102 executing machine readable code instructions of the OTB AI productivity tool 150 in an embodiment may then identify a best match capability associated with a childless capability node, or a capability node at a bottom branch of the hierarchical capabilities decision tree having a highest TF-IDF weighted cosine semantic similarity search score in comparison to only other childless capability nodes across assessed branches within the hierarchical capabilities decision tree. In such a way, the hardware processor 102 executing machine readable code instructions of the OTB AI productivity tool 150 in an embodiment may overcome or lessen the impacts of overly narrow focus on particular lineages of the hierarchical capabilities decision tree encountered by a depth-first tree-traversal methodology, and may enhance semantic search performance by also considering critical keywords when determining a matching capability of an AI productivity tool enableable software application that is most likely to address the user's intent within the user query input.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 116, a video/graphics display device 115, an audio microphone 118 for recording user communications, or any combination thereof. Portions of an information handling system 100 may themselves be considered information handling systems 100.

Information handling system 100 may include devices or modules that embody one or more of the hardware devices or hardware processing resources executing machine readable code instructions for one or more software or firmware systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate a plurality of information handling systems 100. In a specific embodiment, code instructions for the OTB AI productivity tool 150, the universal user conversational interface software application 170, and one or more AI productivity tool enableable software applications 111 may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 116 as well as between hardware processors 102, an EC 104, GPU 106 or other, the operating system (OS) 111, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 116 described herein. As described herein, the information handling system 100 further includes a video/graphics display device 115. The video/graphics display device 115 in an embodiment may function as a liquid crystal display (LCD), an organic light emitting diode (OLED), a flat panel display, or a solid-state display. It is appreciated that the video/graphics display device 115 may be wired or wireless and may be an external video/graphics display device 115 that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, hardware processor or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing.

Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. Various software modules comprising application machine readable code instructions 114 may be coordinated by an OS 111, and/or via an application programming interface (API) include a unified device API described herein. An example OS 111 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the EC 104, the GPU 106, a video/graphic display device 115, or other wired I/O devices 116 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 105 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
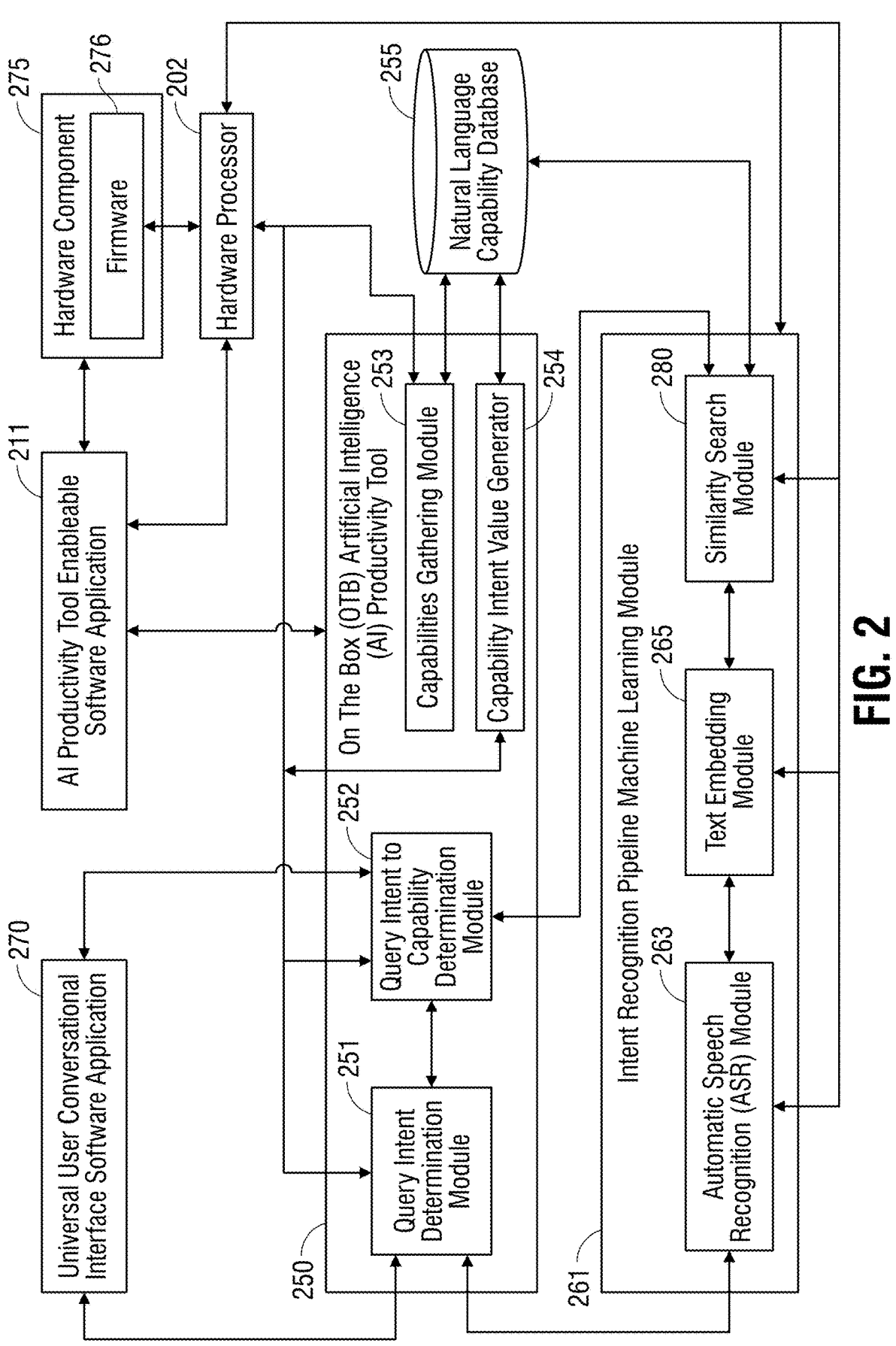
FIG. 2 is a block diagram illustrating computer readable code instructions for an OTB AI productivity tool executable on an information handling system for matching a determined query intent value for a user's query input to a registered capability intent value for an AI productivity tool-enablable software application according to an embodiment of the present disclosure.

FIG. 2 is a block diagram illustrating computer readable code instructions of an information handling system for an on-the-box (OTB) artificial intelligence (AI) productivity tool for correlating a determined query intent value for a user's query input to a registered capability intent value for an AI productivity tool-enablable software application according to an embodiment of the present disclosure. The AI productivity tool enableable software application 211 in an embodiment may then execute a responsive capability for operations, software services, or generating a response to meet the chatbot input query. A manufacturer of information handling systems, such as personal or enterprise computers, may develop and install on individual edge device information handling systems machine readable code instructions for an OTB AI productivity tool 250 that employs one or more locally executed machine learning models, such as 263, 265, or 280, to optimize user productivity and performance with the information handling system using artificial intelligence algorithms. Examples of artificial intelligence algorithms includes ML model algorithms used with chatbots, such as universal user conversational interface software application 270 to simulate conversations between the information handling system executing machine readable code instructions of the AI productivity tool enableable software application 211 and the user, via the OTB AI productivity tool 250 to execute one or more capabilities for an application software service, response or other function in response to a user query input. For example, a response to a user query via OTB AI productivity tool 250 may trigger processes of one or more AI productivity tool enableable software applications 211 in embodiments herein.

The OTB AI productivity tool 250 in an embodiment may receive, via a universal user conversational interface software application 270 or other interface, a voice or text input from a user, described herein as a user query input, that requests actions or services of various software applications in natural language. A hardware processor 202 executing code instructions of the OTB AI productivity tool 250 in an embodiment may match these received user queries, or user query inputs to known capabilities of one or more of the AI productivity tool-enableable software applications 211 through execution by the hardware processor 202 of machine readable code instructions for one or more natural language processing machine learning models. AI productivity tool enableable software application 211 may have or publish a list of recognized "capabilities" or functionalities that it may perform during execution of such an AI productivity tool enableable software application 211 in response to a query input received and processed by the OTB AI productivity tool 250 into a query intent vector value. The capabilities are provided text descriptors that may be processed into vectorized capability intent values in a multi-axis vector space such that these intent value mathematical representations of a query and a capability may be correlated by a similarity matching algorithm to select a capability responsive to an input query from a user.

This process includes gathering, either in real-time or prior to execution of the OTB AI productivity tool 250, via the capabilities gathering module 253, capabilities associated with each of a plurality of AI productivity tool-enablable software applications 211. These capabilities (also called capability intents and having capability intent values) may describe those functionalities of each of the AI productivity tool-enablable software applications 211, that may be used when interfacing with the OTB AI productivity tool 250. These natural language descriptions of the capabilities for the AI productivity tool-enableable software applications 211 may be stored within a natural language capability database 255 for comparison to received user query inputs, for example, in order to identify a capability most likely to address a user's request within the received user query inputs.

As described herein, and specifically in greater detail below with respect to FIG. 3, the natural language descriptions of capabilities for the AI productivity tool enableable software applications 211 in an embodiment may be organized into capability nodes in a hierarchical capabilities decision tree stored at the natural language capabilities database 255 that maps logical parent-child relationships between and among the plurality of natural language descriptions that are pre-established by an information technology decision maker (ITDM) or other person. Each capability node of this hierarchical capabilities decision tree in an embodiment may include, within metadata or other data, a capability name, capability identification (ID) (e.g., in alphanumeric values), and a natural language description of the capability. In some embodiments, each node may further include a capability intent value, or one or more keywords within the capability natural language description. Further, each capability node may include metadata or data indicating a link with an associated parent or child capability node in the hierarchical capabilities decision tree at the natural language capability database 255. The hierarchical capabilities decision tree in an embodiment may identify child capability node natural language descriptions or phrases therewithin as providing greater specificity than its identified parent capability node natural language description or phrases. Further, as a new capability is added it is pre-established at a location within this hierarchical capabilities decision tree and the its capability node is provided with metadata or other data indicating parent or child relationships in embodiments herein. For example, a parent capability node having a natural language description phrase such as "passwords" may have two child capability node natural language description phrases, including "Microsoft password," and "Outlook password," each providing a more specific example of the parent phrase "password." Each of the child capability nodes will have metadata or other data linkage to the parent "passwords" but not to one another.

Parent capability node natural language descriptions or phrases may be separated from children capability node natural language descriptions or phrases by branches within the hierarchical capabilities decision tree stored at the natural language capabilities database 155 in an embodiment. Each level of the hierarchical capabilities decision tree may thus include one or more capability nodes identified as a child, and connected via a branch to one of the parent capability nodes in the previous level of the hierarchical capabilities decision tree. Each capability natural language description or phrase identified as a child capability node in such a way within the hierarchical capabilities decision tree may include an identification of its parent capability node or parent capability natural language description/phrase within the metadata or other data stored at the natural language capabilities database 255.

The hardware processor 202 executing machine readable code instructions for a capability intent value generator 254 of the OTB AI productivity tool 250 may determine capability intent values associated with natural language descriptions of the gathered capabilities for each of a plurality of AI productivity tool-enablable software applications 211. These capability intent values are a mathematical representation of the natural language descriptions of capability operations or services from various AI productivity tool-enablable software applications 211 in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a natural language capability database 255. Generating such capability intent values as vectors may be a first step in a natural language processing method to determine a capability corresponding to and responsive to the user's intent or requested action within a user query input that takes into account the context or semantics of the words used within the user query input.

In an embodiment, the natural language capability database 255 may store a plurality of capabilities associated with each of a plurality of AI productivity tool-enablable software applications 211 in capability nodes with a name, capability ID, natural language descriptor, or a capability intent value, as well as metadata and data for parent/child relationships or other capability related information in some embodiments. These capabilities stored at the natural language capability database 255 may include any input and output capabilities provided by the AI productivity tool-enablable software applications 211 being executed by the hardware processor 202 or any other hardware processing devices (104 or 106 of FIG. 1). For example, an AI productivity tool-enablable software application 211 may include a word processing application such as Microsoft® Word® that may receive input (e.g., via voice at a microphone 118 or text via a keyboard 116 of FIG. 1) and provide output via text. Still further, other examples of an AI productivity tool-enablable software application 211 may include an updating software, virus protection software, and setting optimization software such as Dell® SupportAssist® module executable by the hardware processor or other hardware processing resource of the information handling system. With SupportAssist® a user may provide input via, for example, the microphone (118 of FIG. 1) requesting information related to a setting associated with the information handling system. Thus, capabilities of SupportAssist® may include virus protection capabilities, setting manipulation capabilities, and software updating capabilities that may each be stored at the natural language capability database 255.

Even further, examples of an AI productivity tool-enablable software application 211 may include Dell® Display®/Peripheral Manager®. The Dell® Display®/Peripheral Manager® may have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® software may have capability intent values and a capability identifier stored at the natural language capability database 255 as described herein. It is appreciated that the AI productivity tool-enablable software application 211 may include, for example, Dell® Trusted Device® software, a remediation Dell® APEX Managed Device Service (AMDS)® software, Alienware Command Center (AWCC)® software, among others. Some AI productivity tool-enablable software applications 211 may even be subagents operating locally on the box of the information handling system but have remote access to a larger software application executing at a cloud based server location for providing software services in some embodiments herein.

These capabilities may be registered with the OTB AI productivity tool 250 in an embodiment for establishing capability intent values for these capabilities such that chat user query input intent values may be correlated with one or more capability intent values for registered capabilities, as described herein. For example, in an embodiment in which the AI productivity tool enableable software application 211 is software application for optimizing performance of hardware components at the information handling system, such capabilities may include adjusting settings or configurations for various hardware components. As another example, in an embodiment in which the AI productivity tool enableable software application 211 optimizes performance of other software applications, such capabilities may include automatically downloading and installing updates for such AI productivity tool enableable software applications 211. In yet another example, in an embodiment in which the AI productivity tool enableable software application 211 is one of several software applications routinely executing on the information handling system, and optimized by such an OTB AI productivity tool 250, such capabilities may include automatically generating and transmitting e-mails or text messages, automatically scheduling meetings, or generating chatbot or other user interface responses. These capabilities may be registered as capability nodes and associated with a specific AI productivity tool enableable software application 211, and stored with capability name, capability ID, natural language descriptor, capability intent value, or other data in a hierarchical capabilities decision tree at the natural language capability database 255 in an embodiment.

Each of the capabilities stored at the natural language capability database 255 may have a description with text descriptors, may be associated with a unique ID, and may have a capability intent value as well as any metadata or other data associated with the capability in the capability nodes such as parent/child relationship designations in an embodiment. Upon registration of a given capability by the AI productivity tool enableable software application 211 in an embodiment, a hardware processor 202 for the information handling system may execute machine readable code instructions for one or more text embedding algorithms to generate a multi-dimensional vector capability intent value for that capability that, for example, may be based on text descriptors for that capability. Each of these capability intent values for association with these capabilities may also be associated with an ID such as an alphanumeric ID that may identify, uniquely, these capabilities in the natural language capability database 255, for example. These capability intent values may later be used to determine which of the capabilities a user intends to invoke or execute within a received user query input based on similarity with a query intent value, as described herein.

Upon determination of a capability intent value for each of the gathered or registered AI productivity tool enableable software application capabilities, the OTB AI productivity tool 250 may begin processing received user query inputs from the universal conversational interface software application 270 or other interface for execution of capabilities for an application software service, response or other function corresponding to one of these capability intent values. In an example embodiment, a user may provide a user query input in the form of text or voice data (e.g., via IO device 116, or microphone 118 of FIG. 1) to a universal user conversational interface software application 270, executing machine readable code instructions as a chatbot with the OTB AI productivity tool 250 to simulate a conversation between the user and the AI productivity tool enableable software application 211. When a user provides a user query input in the form of text or voice data (e.g., via IO device 116, or microphone 118 of FIG. 1) in natural language to the universal user conversational interface software application 270, the hardware processor 202 executing machine-readable code instructions of the OTB AI productivity tool 250 in an embodiment may orchestrate assessment of the user's intended goals within the user query input (e.g., what the user wishes to achieve with this communication) with determination of a query input intent value, and identify one or more capabilities associated with the AI productivity tool enableable software application 211 having a correlating capability intent value and that is capable of executing a response to this user query input intent. Further, the OTB AI productivity tool 250 may initiate performance of one or more tasks employing those capabilities to achieve the user-intended results to the user query input.

This orchestration in an embodiment may begin with the hardware processor 202 executing machine-readable code instructions of the query intent determination module 251 to receive the user query input via microphone, image, or text input, and initiate execution of machine readable code instructions for an intent recognition pipeline machine learning module 261. In an embodiment, the hardware processor 202 executing machine-readable code instructions for the intent recognition pipeline machine learning module 261 may further orchestrate any combination of a plurality of machine learning modules (e.g., 263, 265, or 280) to process the audio or text input to determine the user's intended goal or query intent within the received text or voice data of the user query input. During operation for example, the hardware processor 202 executing machine-readable code instructions of the query intent determination module 251 may load one or more machine learning models such that, for example, the text or voice input from the user may be processed through a speech recognition model 263 and/or processed through any of a plurality of natural language models (e.g., 265 or 280) or other ML models in order to determine a text of a user's input query or an intent value of the user's input query. For example, an automatic speech recognition (ASR) module 263, a text embedding module 265, or a similarity search module 280 that work in various combinations with one another to detect a user's audio speech input, conversion to text or detecting text, and detecting an intent, represented by generating a query intent vector value from the text of the user query input received from the universal user conversational interface software application 270 or other interface such as one specific to an AI productivity tool enableable software application.

Further, the hardware processor 202 executing machine-readable code instructions of an intent recognition pipeline machine learning module 261 may orchestrate the interplay between each of the ASR module 263, text embedding module 265, and similarity search module 280 to establish a query intent vector value in a multi-axis vector space defined with these machine learning models and correlate that query intent value with a corresponding capability intent value in an embodiment. Several text embedding algorithms may be used in various embodiments herein in order to provide a vectorized mathematical representation of semantic understanding for a user query input or for a capability described in natural language. For example, the text embedding module 265 may employ a Latent Semantic Analysis (LSA) or Latent Dirichlet allocation (LDA) which may define how close each of the observed terms in the received user query input are to various synonyms. As another example, the text embedding module 265 may employ a Word2Vec algorithm, which includes a neural network trained to understand which terms or phrases should be considered closer or further away from certain synonyms or antonyms. As yet another example, the text embedding module 265 may employ a fully recurrent neural network trained to consider the order of terms within the received user query input or the natural language descriptors of the capabilities for the AI productivity tool enableable software applications 211.

In an embodiment in which the user provides text data to the AI productivity tool enableable software application 211, such an intent recognition pipeline machine learning module 261 may truncate this process to exclude processes of the ASR module 263. The hardware processor 202 executing machine-readable code instructions of the intent recognition pipeline machine learning module 261 in an embodiment may apply the text embedding module 265 to generate a query intent value as described and then return the output query intent value of the text embedding module 265 to the query intent to capability determination module 252. The query intent to capability module may utilize the similarity search module 280 for a correlation between the query intent value received and a stored capability intent value. Such a similarity search module 280 in an embodiment may perform a semantic similarity search or a weighted semantic similarity search that includes a comparison between the received user query input and a subset of the gathered natural language capabilities stored in the natural language capabilities database 255 based on branches within the hierarchical capabilities decision tree, as described in greater detail below with respect to FIGS. 3-7. In an example embodiment, a semantic cosine similarity search may compare angular value differences or correlation between a query vector intent value of a user query input and capability intent values of a description of the capabilities to determine correlation between the two to identify a responsive capability.

In order to increase the accuracy of the above-described semantic search or comparison results, such as the cosine semantic similarity algorithm, the hardware processor 202 executing machine readable code instructions for the similarity search module 280 in an embodiment may, for each compared user query input and natural language capability, also perform a TF-IDF comparison. Such a TF-IDF comparison may determine existence and frequency for particular keywords or synonyms within the user query input natural language and the natural language descriptions of capabilities being compared in embodiments herein. The output of the semantic search comparison may then be weighted by the TF-IDF comparison for each natural language capability compared to the user query input, via the hardware processor 202 executing machine readable code instructions of the similarity search module 280. The hardware processor 202 executing machine readable code instructions of the query intent to capability determination module 252 of the OTB AI productivity tool 250 may then determine a best match capability having a highest TF-IDF weighted cosine semantic similarity search score among the natural language capabilities.

As described below, the capability nodes are organized into a hierarchical capabilities decision tree in the natural language capabilities database memory device 255. Thus, the semantic similarity search across the nodes may determine a highest TF-IDF weighted cosine semantic similarity search score among the childless capability nodes at a bottom level of each parent-child lineage or branch of the hierarchical capabilities decision tree according to the search algorithms of the present disclosure. In other embodiments, a partial elimination of parent capability nodes have a very low correlation may eliminate some branches of a hierarchical from the weighted semantic similarity search algorithm of embodiments herein to limit processing requirements. In such a way, the hardware processor 202 executing code instructions for the OTB AI productivity tool 250 may enhance semantic search performance by also considering critical keywords with a breadth-first search algorithm or modified breadth-first search algorithm when determining a matching capability of an AI productivity tool enableable software application 211 that is most likely to address the user's intent within the user query input while providing assessment of a larger group of capability nodes than a strictly depth-first search algorithm according to embodiments herein.

In an example embodiment, the detected intent having a query intent value in a multi-axis vector space, such as "decrease display brightness," "speed up my application," or "send a text message" may be correlated to a capability node of a known registered capability or functionality of AI productivity tool enableable software application 211 at the information handling system. More specifically, the intent "decrease display brightness" may be associated with a capability for adjusting settings or configurations for a display device (115 of FIG. 1), based on similarity correlation between a query intent value and a capability intent value as determined by the similarity search module 280. As another example, the query intent "speed up my application" may be associated with a capability associated with the AI productivity tool enableable software application 211 for automatically downloading and installing updates for such AI productivity tool enableable software application 211, based on similarity correlation between a query intent value and a capability intent value as determined by the similarity search module 280. In yet another example, the query intent "send a text message" may be associated with a capability of the AI productivity tool enableable software application 211 to automatically generate and transmit text messages, based on similarity correlation between a query intent value and a capability intent value as determined by the similarity search module 280. As described above, these "capabilities" may be registered and associated with a specific AI productivity tool enableable software application 211 at the capability intent value database 256 in an embodiment.

Upon identification of a capability that addresses the determined query "intent" of the user within the received user query input, the hardware processor 202 executing machine-readable code instructions of the OTB AI productivity tool 250 may direct execution of one or more processes at the AI productivity tool enableable software application 211, via the universal user conversational interface software application 270 associated with that capability. For example, the hardware processor 202 executing machine-readable code instructions of the query intent to capability determination module 252 may directly instruct the AI productivity tool enableable software application 211 to undertake the identified "capability." In such a way, the OTB AI productivity tool 250 may orchestrate a plurality of machine learning modules via an intent recognition pipeline machine learning module 261 to determine a query intent from a received user query input, and identify a corresponding vectorized capability intent value having threshold similar to the query intent value and execute a capability of the AI productivity tool enableable software application 211 to execute this capability as an operation, software service, response, or other function responsive to the user's query input.

Figure 3:
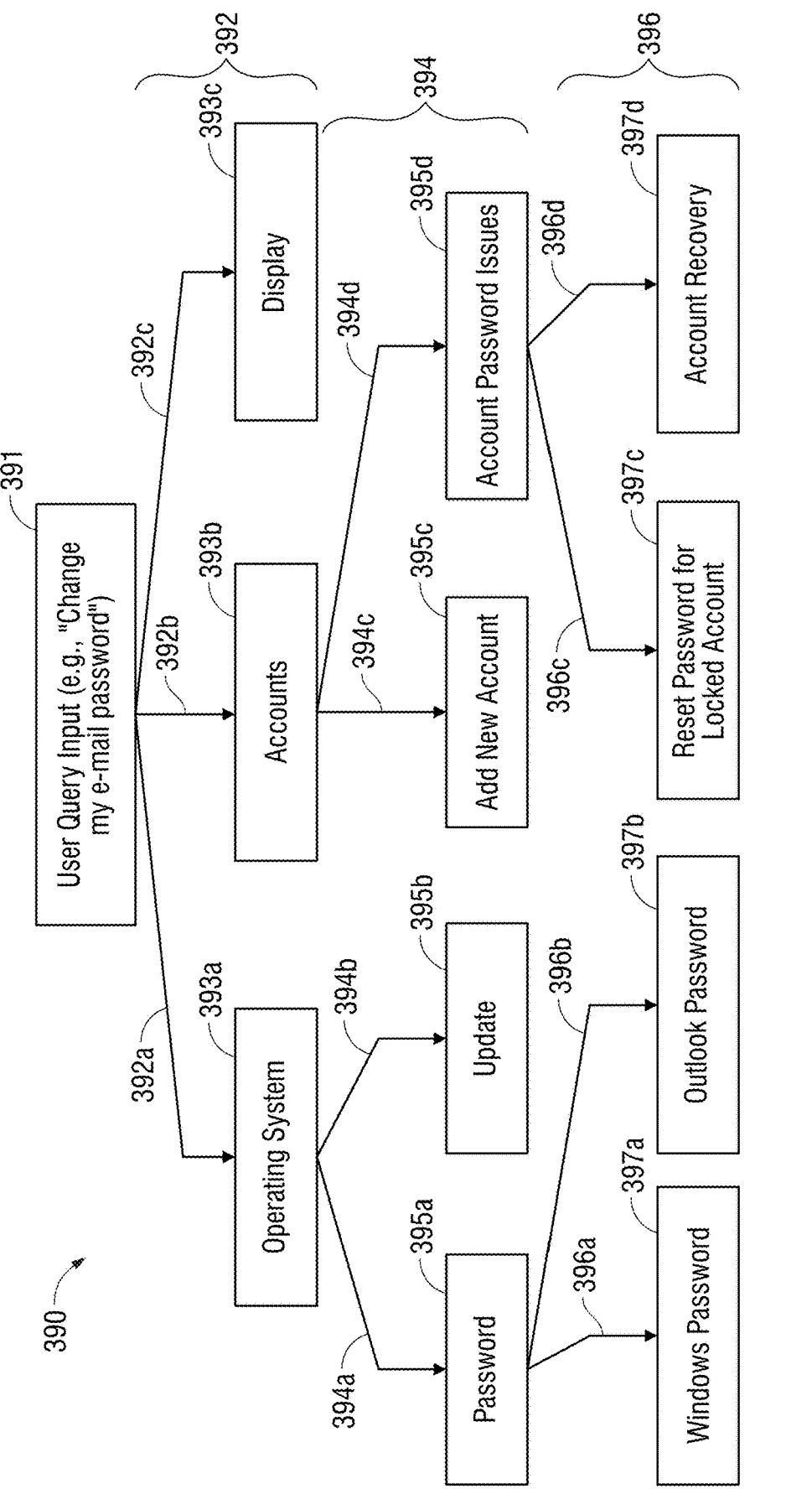
FIG. 3 is a block diagram illustrating a hierarchical capabilities decision tree defining parent-child relationships among a plurality of natural language phrases given within a plurality of natural language descriptions of AI productivity tool enableable software application capabilities in a natural language capability database according to an embodiment of the present disclosure.

FIG. 3 is a block diagram illustrating a hierarchical capabilities decision tree defining parent-child relationships among a plurality of natural language phrases for capability nodes given within a plurality of natural language descriptions of AI productivity tool enableable software application capabilities such as within a natural language capability database according to an embodiment of the present disclosure. As described herein, the natural language descriptions of capabilities for the AI productivity tool enableable software applications in an embodiment may be organized into a hierarchical capabilities decision tree 390 that maps capability nodes and is pre-established for logical parent-child relationships between and among the plurality of natural language descriptions of capabilities in those capability nodes in an embodiment.

Each capability node of this hierarchical capabilities decision tree 390 in an embodiment may have the same data fields, including a capability name, an associated AI productivity tool enableable software application, capability identification (ID) (e.g., in alphanumeric values), and a natural language description or phrase therewithin of the capability. Further, each node may include metadata or other data indicating parent/child relationships as well as other capability related information in embodiments herein. Still further, the nodes of the hierarchical capabilities decision tree 390 may include a capability intent value generated or established for each capability from its natural language description.

In an example embodiment of FIG. 3, an initial node 391 in an embodiment may include a natural language description phrase of a query input and may also include a generated query intent value generated from the natural language of the query received via either an audio input or text input in example embodiments. In an example embodiment, the hierarchical capabilities decision tree 390 includes three example capability nodes 393*a*, 393*b*, and 393*c* at a first node level 392. For example, a first capability node 393*a* in an embodiment may include a natural language description phrase of "Operating System," and may also include a capability name, and a capability ID as well as an associated capability intent value, and data or metadata designating capability nodes 395*a* and 395*b* as child nodes, but not designating any parent nodes. In yet another example, a capability node 393*b* in an embodiment may include a natural language description phrase of "accounts," and may also include a capability name, a capability ID, and an associated capability intent value. Node 393*b* may have designation of child capability nodes 395*c* and 395*d*. In still another example, a capability node 393*c* in an embodiment may include a natural language description phrase of "display," and may also include a capability name, a capability ID, and an associated capability intent value with no designated child capability nodes.

As yet another example, a capability node 395*a* at a second level 394 in an embodiment may include a natural language description phrase of "password," and may also include a capability name, a capability ID, and associated capability intent value as well as designation of child capability nodes 397*a* and 397*b* and parent 393*a*. In yet another example, a capability node 395*b* of second level 394 in an embodiment may include a natural language description phrase of "update," and may also include a capability name, a capability ID, and associated capability intent value with no designation of child capability nodes and designation for a parent capability node 393*a*. For another example, a capability node 395*c* in an embodiment may include a natural language description phrase of "add new account," and may also include a capability name, a capability ID, associated capability intent value with no designation of child capability nodes and designation for a parent capability node 393*b*. In another example, a capability node 395*d* of second level 394 in an embodiment may include a natural language description phrase of "account password issues," and may also include a capability name, a capability ID, associated capability intent value, and designation of child capability nodes 397*c* and 397*d* and designation for a parent capability node 395*d*.

Still another example shows a capability node 397*a* of third level 396 in an embodiment including a natural language description phrase of "windows password," and may also include a capability name, and a capability ID, and associated capability intent value with no designation of child capability nodes and designation for a parent capability node 395*a*. In yet another example, a capability node 397*b* of third level 396 in an embodiment may include a natural language description phrase of "Outlook password," and may also include a capability name, a capability ID, and associated capability intent value with no designation of child capability nodes and designation for a parent capability node 395*a*. As yet another example, a capability node 397*c* in third level 396 in an embodiment may include a natural language description phrase of "reset password for locked account," and may also include a capability name, a capability ID, and associated capability intent value with no designation of child capability nodes and designation for a parent capability node 395*d*. In yet another example, a capability node 397*d* in third level 396 in an embodiment may include a natural language description phrase of "account recovery," and may also include a capability name, a capability ID, and associated capability intent value with no designation of child capability nodes and designation for a parent capability node 395*d*. In some embodiments, each of the capability nodes 393*a*, 393*b*, 393*c*, 393*d*, 395*a*, 395*b*, 395*c*, 395*d*, 397*a*, 397*b*, 397*c*, and 397*d* may further include the associated capability intent value, as well as one or more keywords within the capability natural language description and other capability related data.

Each capability node, such as 393*c*, 395*b*, 395*c*, 397*a*, 397*b*, 397*c*, and 397*d*, that has no designation of child nodes within associated metadata may be considered a "childless" capability node as described herein. As can be seen in FIG. 3, any level 392, 394, or 396 of the hierarchical capabilities decision tree 390 may include one or more of such childless capability nodes. For example, childless capability node 393*c* may be included in a first level 392, childless capability nodes 395*b* and 396*c* may be included in a second level 394, and childless capability nodes 397*a*, 397*b*, 397*c*, and 397*d* may be included within the third level 396. Further, such a childless capability node, its immediate parent capability node, and all parent capability nodes within a chain of parent capability nodes may represent a single parent-child lineage or branch as described herein. As described in embodiments herein, only the TF-IDF weighted cosine semantic similarity search scores for childless capability nodes, or capability nodes at the bottom of each parent-child lineage or branch within the hierarchical capabilities decision tree may be considered as candidate capability nodes for best match capabilities to meet the user's request within the received user query input. This breadth-first similarity search algorithm may determine TF-IDF weighted semantic similarity scores for these childless capability nodes at any level of hierarchical capabilities decision tree 390 according to embodiments herein.

The hierarchical capabilities decision tree 390 described with reference to FIG. 3 is only one example that includes a handful of example natural language descriptions for capabilities at capability nodes. It is contemplated that other embodiments may include any number of such natural language descriptions for capabilities, as dependent upon the number of natural language descriptions of capabilities for a plurality of AI productivity tool enableable software application that are gathered and stored within the natural language capabilities database and organized within the hierarchical capabilities decision tree 390 for use by an OTB AI productivity tool to determine responsive capability intent actions among capabilities of one or more AI productivity tool enableable software applications.

The hierarchical capabilities decision tree 390 in an embodiment may identify child capability natural language descriptions or phrases in child capability nodes therewithin as providing greater specificity than its identified parent capability natural language description or phrases. For example, a query input node 391 may include a natural language description phrase such as "change my email password" which may correlate with a child capability node 395*a* for "password" after comparison across parent capability nodes 393*a*, 393*b*, and 393*c* in the first level 392. A parent capability node 393*a* for a capability natural language description phrase such as "operating system" may have two child capability nodes 395*a* and 395*b* for capability natural language description phrases, including "password," and "update," respectively, with each child capability node 395*a* and 395*b* providing a more specific example of the parent capability node 393*a* phrase "operating system." Thus, while correlation may not be strong with parent capability node 393*a* for "Operating system" it may be stronger than for capability nodes 393*b* for "accounts" and 393*c* for "display."

Child capability node 395*a* at level two 394 may further have two child capability nodes 397*a* and 397*b* at third level 396 for capability natural language description phrases, including "Microsoft password," and "Outlook password," respectively, with each child capability node 397*a* and 397*b* providing a more specific example of the parent capability node 395*a* phrase "password" in an embodiment. A semantic similarity comparison to parent capability nodes 393*a* to "operating system" may not be assessed later due to a higher correlation of child capability node 395*a* for "password" or a particularly high correlation to its child capability node that is itself a childless capability nodes 397*b* for "Outlook password." According to embodiments herein, the breadth-first TF-IDF weighted semantic similarly search may be conducted across childless capability nodes such as 397*a*, 397*b*, 397*c* and 397*d* of the third level 396 as well as childless capability nodes 395*b* and 395*c* of the second level 394 and childless capability node 393*c* of the first level 392 as described further herein.

As another example, a parent capability node 393*b* for a capability natural language description phrase such as "accounts" may have two child capability nodes 395*c* and 395*b* for capability natural language description phrases, including "add new account," and "account password issues," respectively, with each child capability node 395*c* and 395*d* providing a more specific example of the parent capability node 393*b* phrase "accounts." In yet another example, a parent capability node 395*d* for a capability natural language description phrase such as "account password issues" may have two child capability nodes 397*c* and 397*d* for capability natural language description phrases, including "reset password for locked account," and "account recovery," respectively, with each child capability node 397*c* and 397*d* providing a more specific example of the parent capability node 395*a* phrase "account password issues." As described, capability node 395*c*, capability node 397*c*, and capability node 397*d* may be a childless capability nodes for this branch in embodiments herein.

Parent capability nodes for capability natural language descriptions or phrases may be separated from child capability nodes for capability natural language descriptions or phrases within the hierarchical capabilities decision tree 390 in an embodiment by branches representing reciprocal metadata or other data designations at each parent/child node combination of the parent child capability node relationship within the hierarchical capabilities decision tree 390 in embodiments herein. Each successive level 392, 394 and 396 of the hierarchical capabilities decision tree 390 may thus include one or more capability nodes identified as a child to a parent capability node in the previous level, and connected via a branch to one of the capability nodes in the previous level of the hierarchical capabilities decision tree 390. Each branch, however, may end in one or more childless capability nodes at any level of the hierarchical capabilities decision tree 390 in embodiments herein. Each capability natural language description or phrase identified as a child capability node with a capability ID, capability name and associated capability intent value within the hierarchical capabilities decision tree 390 may also include an identification for its parent capability node or parent capability natural language description/phrase as well as identification for its child capability node, if any, or any child capability natural language description/phrase.

For example, in the first level 392, the first level parent capability node 393*a* may include an identification of its child capability nodes 395*a* and 395*b* and may be linked for comparison to a query input 391 for comparison 392*a*. As another example, in the first level 392, the first level parent capability node 393*b* may include an identification of its child capability nodes 395*c* and 395*d* and may be linked for comparison to a query input 391 for comparison 392*b*. In yet another example, in the first level 392, with the parent capability node 393*c* may include an identification of no child capability nodes and may be linked for comparison to a query input 391 for comparison 392*c*.

Figure 4:
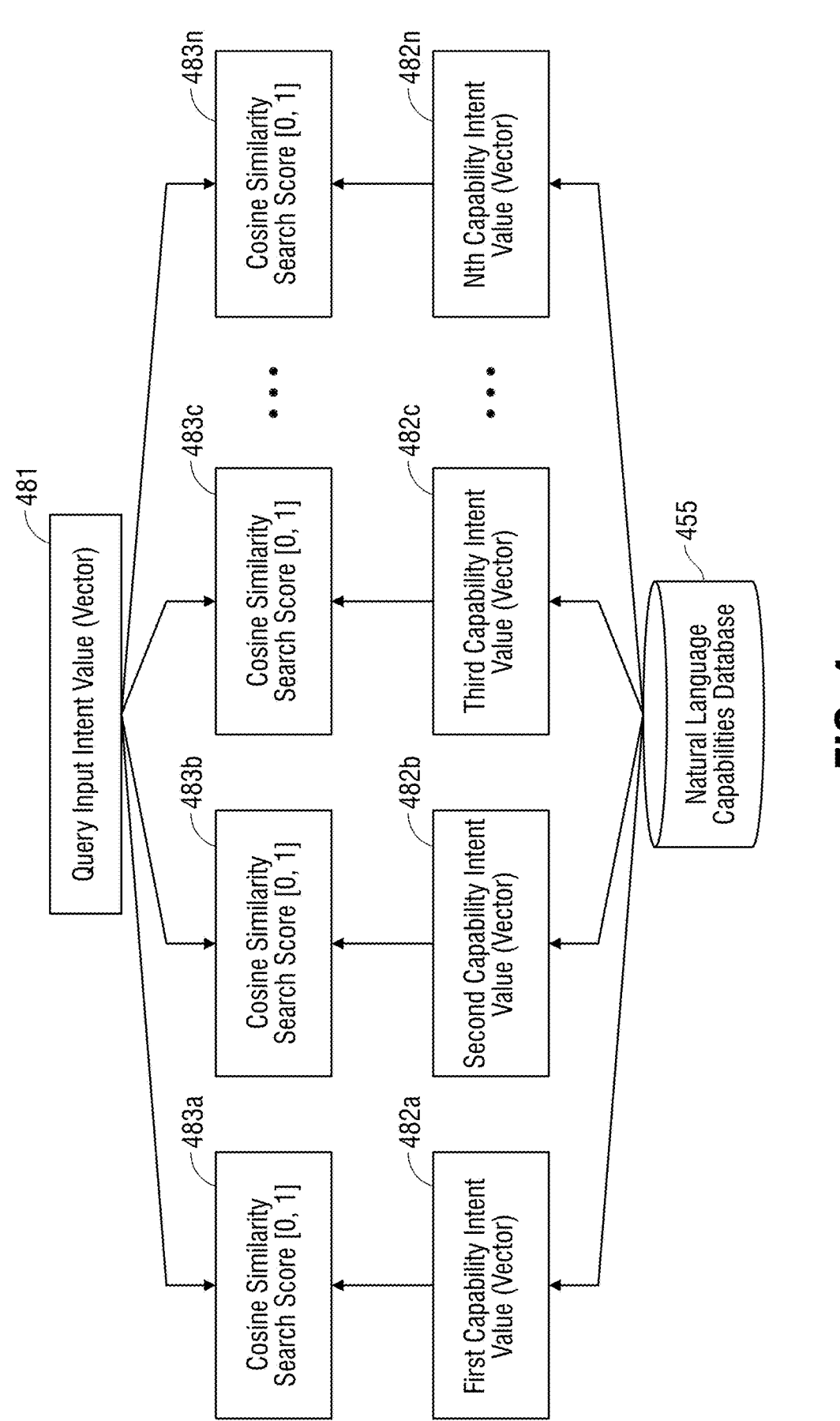
FIG. 4 is a block diagram illustrating a method of identifying cosine or other semantic similarity search scores for a plurality of capabilities, each associated with a capability node of a single level of the hierarchical capabilities decision tree according to an embodiment of the present disclosure.

FIG. 4 is a block diagram illustrating a method of identifying cosine or other semantic similarity search scores for a plurality of capabilities of an artificial intelligence (AI) productivity tool enableable software application across a plurality of capabilities, each associated with a capability node of a single level of the hierarchical capabilities decision tree according to an embodiment of the present disclosure. As described herein, a hardware processor may execute machine readable code instructions for a semantic similarity search machine learning model that analyzes and weighs context and relevancy. For example, in embodiments herein, a hardware processor may execute machine readable code instructions for a semantic similarity search machine learning model, via a query intent to capability module, that compares the vectorized user query input intent value 481 and the capability intent values 482*a*, 482*b*, 482*c*, and 482*n* stored within the capability intent values database 456. Such a comparison may be performed using a semantic search machine learning model, such as a cosine or other semantic similarity search algorithm that compares the distance or value difference in a multi-axis vector space between two vectors (e.g., 481 and each of 482*a*, 482*b*, 482*c*, to 482*n*) to determine the contextual similarity between the natural language description of the embedded text algorithm generated capabilities having the capability intent values 482*a* to 482*n* and the natural language user query input having an user query input intent value 481 generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and query intent vector values. The cosine similarity search comparison or other semantic similarity search algorithm may be performed for several of the capability intent values (such as 482*a*, 482*b*, 482*c*, to 482*n*) stored within the capability intent value database 456 to identify a capability intent value (e.g., 482*b*) that most closely matches the user query input value 481, according to embodiments herein.

As described herein, the natural language capabilities for a plurality of AI productivity tool enableable software applications are provided text descriptors that may be processed into capability intent values, such as 481 in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, a reader's understanding of a given text excerpt may depend upon the reader's knowledge of any given word's meaning within the text, identified phrases within the text, or the understood order or sequence of words within the text. More specifically, the reader's understanding is enhanced by the reader having a larger vocabulary and understanding of which words in that vocabulary are synonyms (closer in meaning) to a given word in that text, and which words are antonyms (further away in meaning) to that given word. As another example, the reader's ability to identify common phrases, such as "in other words" may provide greater insight to the semantic meaning of a text excerpt using this phrase than the reader's understanding of each of the words "in," "other," and "words" used separately from one another. As yet another example, the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies (as determined through TF-IDF comparison), but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor executing machine readable code instructions for a semantic search machine learning model of the similarity search module (e.g., 280 of FIG. 2) may determine a distance, which is a value difference of the vector intent values within the multi-axis vector space indicating correlation level between the query input intent value 481 and each of a plurality of capability intent values 482a to 482n. Then, for each of those determined distances difference, the hardware processor executing machine readable code instructions for a semantic search machine learning model of the similarity search module (e.g., 280 of FIG. 2) may determine an angular similarity having a value between zero and one for the query input intent value 481 and each of a plurality of capability intent values 482a to 482n as a correlation between vectors. This angular similarity value in an embodiment may comprise the cosine similarity search score (e.g., 483a, 483b, 483c to 483n) for a given capability intent value (e.g., 482a, 482b, 482c to 482n, respectively), where zero is a worst match and one is a best match between the given capability intent value (e.g., 482a, 482b, 482c to 482n) and the query input intent value 481.

For example, the hardware processor executing machine readable code instructions for a semantic search machine learning model of the similarity search module (e.g., 280 of FIG. 2) may determine that the phrase "operating system" has a cosine similarity search score 483a of 0.5 when compared against the query input intent value for the query input intent "reset password for locked account." In another example, the hardware processor executing machine readable code instructions for a semantic search machine learning model of the similarity search module may determine that the phrase "accounts" has a cosine similarity search score 483b of 0.745 when compared against the query input intent value for the query input intent "reset password for locked account." In still another example, the hardware processor executing machine readable code instructions for a semantic search machine learning model of the similarity search module may determine that the phrase "display" has a cosine similarity search score 483c of 0.1 when compared against the query input intent value for the query input intent "reset password for locked account." In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

Figure 5:
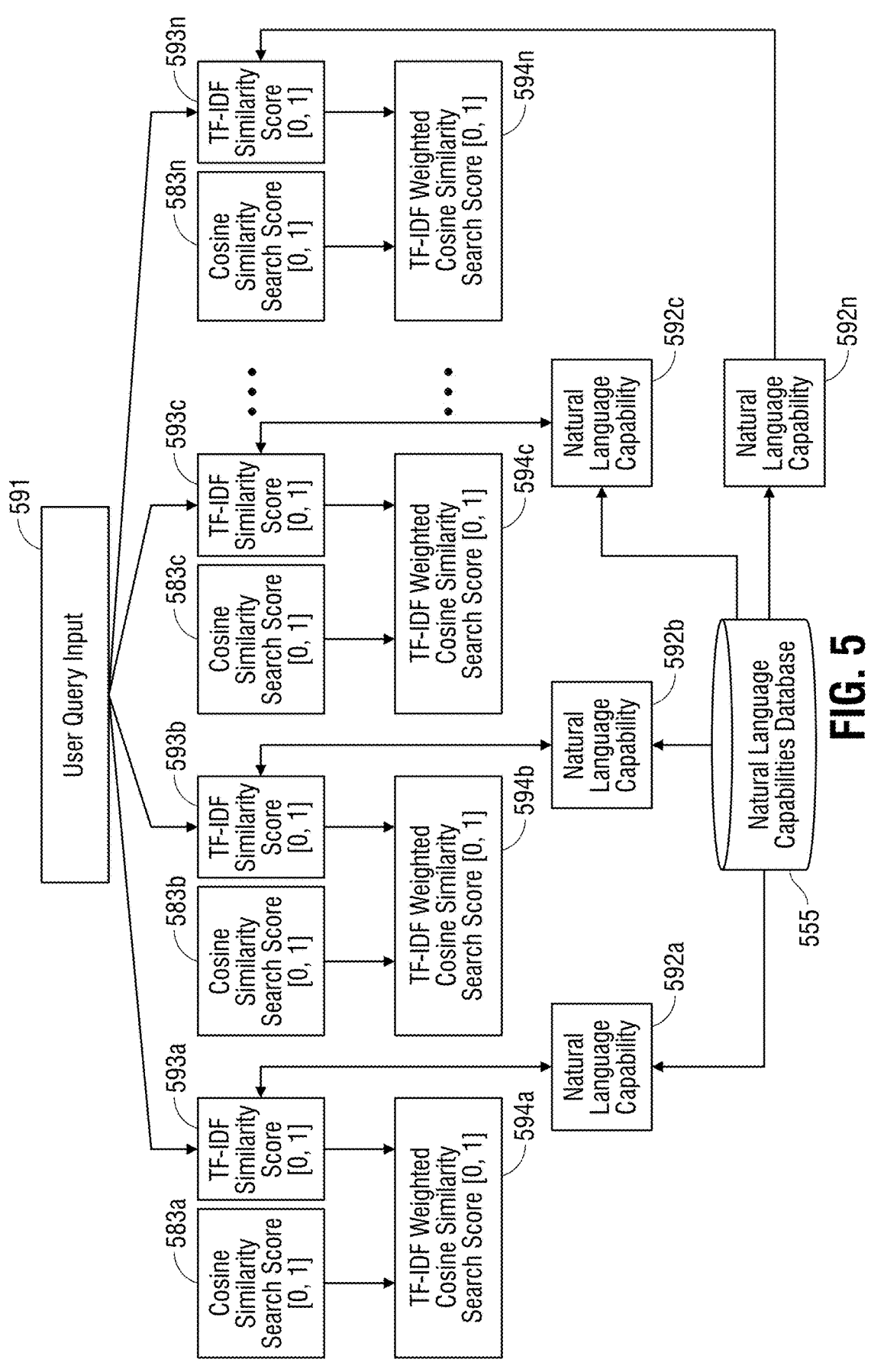
FIG. 5 is a block diagram illustrating a method of identifying capability of an artificial intelligence (AI) productivity tool enableable software application that best matches a received user query input by weighting a semantic similarity search score by a text frequency-inverse document frequency (TF-IDF) or other lexical similarity search score according to an embodiment of the present disclosure.

FIG. 5 is a block diagram illustrating a method of identifying capability of an artificial intelligence (AI) productivity tool enableable software application that best matches a received user query input by weighting a semantic similarity search score by a text frequency-inverse document frequency similarity search score according to an embodiment of the present disclosure. As described herein, while semantic search algorithms, such as that described above with respect to FIG. 4 are better-suited than TF-IDF algorithms alone for use with natural language text excerpts for context accuracy, such as the user query input 591 and the natural language descriptions of capabilities 592a, 592b, 592c, through 592n, TF-IDF algorithms are better-suited than semantic search algorithms where a single keyword within the user query input 591 is important to identifying a matching capability (e.g., 592a, 592b, 592c, up to 592n) for an AI productivity tool-enableable software application to address the user's concerns. For example, a user may provide a natural language user query input 591 such as "reset password for locked account." In such a scenario the semantic search algorithms described above with respect to FIG. 4 may identify that an account issue has occurred, but it may not focus heavily on the terms "password," or "locked," which may be important or determinative in finding the right capability (e.g., 592a, 592b, 592c, or 592n) for an AI productivity tool enableable software application to resolve the error code. In such a case, it may be useful to also perform a TF-IDF comparison for the user query input 591 across the stored natural language descriptions of the capabilities (e.g., 592a, 592b, 592c to 592n) within the natural language capabilities database 555 to identify the capability (e.g., 592c) that best addresses the specific terms "password," and "locked," as well as "account."

As described herein, in order to increase the accuracy of the cosine or other semantic similarity search scores, such as 483a to 483n of FIG. 4 above in determining when a capability for an AI productivity tool enableable software application may address the user's request within a received user query input, the hardware processor executing machine readable code instructions for the query intent to capability determination module of the OTB AI productivity tool in an embodiment may, for each compared user query input 591 and natural language capability 592a to 592n, perform a TF-IDF comparison. For example, as shown in FIG. 5, and as part of the similarity search described above with reference to FIG. 4, the hardware processor executing machine readable code instructions for the similarity search module may determine the cosine or other semantic similarity search score 583a of 0.5 describing a degree of similarity between the query input intent value (e.g., 481 of FIG. 4) for the user query input 591 of "reset password for locked account," and the capability intent value (e.g., 482*a* of FIG. 4) for a natural language description of a capability 592*a* of "operating system" stored within the natural language capabilities database 555. As another example, the hardware processor executing machine readable code instructions for the similarity search module may determine the cosine or other semantic similarity search score 583*b* of 0.745 describing a degree of similarity between the query input intent value (e.g., 481 of FIG. 4) for the user query input 591 of "reset password for locked account," and the capability intent value (e.g., 482*b* of FIG. 4) for a natural language description of a capability 592*b* of "accounts" stored within the natural language capabilities database 555. In yet another example, the hardware processor executing machine readable code instructions for the similarity search module may determine the cosine or other semantic similarity search score 583*c* of 0.1 describing a degree of similarity between the query input intent value (e.g., 481 of FIG. 4) for the user query input 591 of "reset password for locked account," and the capability intent value (e.g., 482*c* of FIG. 4) for a natural language description of a capability 592*c* of "display" stored within the natural language capabilities database 555.

This may be repeated for each of the natural language capabilities (e.g., up to 592*n*) stored within a given level of the natural language capabilities database 555 (e.g., first level 392 of FIG. 3), to produce a cosine or other semantic similarity search score of 583*n*. Further, this may be repeated for each node of each level of the natural language capabilities database 555 (e.g., levels 394 and 396 of FIG. 3). In embodiments where a modified breadth-first similarity search is used, a low correlation branch such as the semantic similarity score 583*c* of 0.1 between user query input 591 and capability 592*c* for "display" may eliminate that branch from further similarity search comparisons while all remaining capability nodes may be compared. In other embodiments, all capability nodes in a hierarchical capabilities decision tree are compared with a breadth-first similarity search.

In an embodiment, each of these cosine similarity search scores 582*a* to 582*n* may then be weighted by a TF-IDF similarity score (e.g., 593*a*, 593*b*, 593*c*, to 593*n*, respectively), in order to increase the accuracy of the cosine similarity or other semantic search scores 583*a* to 583*n* in determining when a capability (e.g., 592*a* to 592*n*) for an AI productivity tool enableable software application may address the user's request within the received user query input 591. For example, the hardware processor executing code instructions for the similarity search module (280 of FIG. 2) may perform a TF-IDF algorithm to measure the frequency with which each of a plurality of natural language terms appear within the user query input 591, as weighted by the frequency with which that term occurs in one of each of the natural language capabilities 592*a* to 592*n* stored within the natural language capabilities database 555. More specifically, the hardware processor executing code instructions for a TF-IDF algorithm may determine a TF-IDF similarity score 593*a* of 0.1 measuring the frequency with which each of a plurality of natural language terms appear in the user query input 591 of "reset password for locked account," as weighted by the frequency with which each of those terms also occur within the natural language capability 592*a* of "operating system." As another example, the hardware processor executing code instructions for a TF-IDF algorithm may determine a TF-IDF similarity score 593*b* of 0.98 measuring the frequency with which each of a plurality of natural language terms appear in the user query input 591 of "reset password for locked account," as weighted by the frequency with which each of those terms occur within the natural language capability 592*b* of "accounts." In yet another example, the hardware processor executing code instructions for a TF-IDF algorithm may determine a TF-IDF similarity score 593*c* of 0.001 measuring the frequency with which each of a plurality of natural language terms appear in the user query input 591 of "reset password for locked account," as weighted by the frequency with which each of those terms occur within the natural language capability 592*c* of "display."

This may be repeated for each of the natural language capabilities (e.g., up to 592*n*) stored within a given level of the natural language capabilities database 555 (e.g., first level 392 of FIG. 3), to produce a TF-IDF similarity search score up to 593*n*. Further, this may be repeated for each node of each level of the natural language capabilities database 555 (e.g., levels 394 and 396 of FIG. 3) for a breadth-first similarity search algorithm or may be modified if a modified breadth-first similarity search is conducted according to various embodiments herein. Each TF-IDF similarity score determined in such a way may have a value between zero and one. It is contemplated that any number of known or later-developed TF-IDF comparison algorithms may be used, including the best-match 25 (BM25) algorithm, the Okapi BM25 algorithm, and the BM-25 with fields (BM-25F).

Each of the cosine or other semantic similarity search scores 583*a* to 583*n* output of the semantic search comparison is be weighted by one of the TF-IDF similarity search scores 593*a* to 593*n*, respectively, for each natural language capability 592*a* to 592*n*, respectively, that is compared to the user query input 591, via the hardware processor executing machine readable code instructions of the query intent to capability determination module. For example, the cosine or other semantic similarity search scores 583*a* to 583*n* may be multiplied by the TF-IDF similarity search scores 593*a* to 593*n*, respectively in an embodiment. In another example embodiment, a TF-IDF weighted cosine or other semantic similarity search score 594*a* of 1.65 may be determined by a hardware processor executing code instructions of the query intent to capability determination module as equivalent to one plus the cosine or other semantic similarity search score 583*a* of 0.5, multiplied by one plus the TF-IDF similarity search score 593*a* of 0.1. In still another example embodiment, a TF-IDF weighted cosine or other semantic similarity search score 594*b* of 3.46 may be determined by a hardware processor executing code instructions of the query intent to capability determination module as equivalent to one plus the cosine or other semantic similarity search score 583*b* of 0.745, multiplied by one plus the TF-IDF similarity search score 593*b* of 0.98. In yet another example embodiment, a TF-IDF weighted cosine or other semantic similarity search score 594*c* of 0.1 may be determined by a hardware processor executing code instructions of the query intent to capability determination module as equivalent to one plus the cosine or other semantic similarity search score 583*c* of 0.1, multiplied by one plus the TF-IDF similarity search score 593*c* of 0.001. This may be repeated for each of the natural language capabilities (e.g., up to 592*n*) stored within the natural language capabilities database 555, to produce a TF-IDF weighted or other semantic cosine similarity search score of 594*n*.

FIG. 6 is a block diagram illustrating a method of executing computer readable code instructions to identify a capability that best matches a received user query input by having a highest parent score and TF-IDF weighted cosine similarity search score across all childless capability nodes in a similarity search of a hierarchical capabilities decision tree according to an embodiment of the present disclosure. The parent/child relationships between capability nodes of a hierarchical capabilities decision tree may be identified in metadata of the capability nodes to define chains or branches of parent and child nodes in a hierarchical capabilities decision tree of capabilities in a natural language capabilities database with each capability node having capability intent values according to embodiments herein. By conducting a semantic similarity comparison search of the capability nodes in the hierarchical capabilities decision tree, childless capability nodes at the bottom of each of the branches of the hierarchical capabilities decision tree may be reached to determine which generates a highest term frequency-inverse document frequency (TF-IDF) weighted cosine similarity search score to identify a best match capability for meeting the user's request within the user query input via a breadth-first similarity search algorithm.

As in embodiments described herein, a hardware processor executing machine readable code instructions for the query intent to capability determination module of the OTB AI productivity tool may compare via semantic similarity comparison of the vectorized user query input intent value 681 and each of several capability intent values within each level of the hierarchical capabilities decision tree as weighted by TF-IDF comparison of the user query input and the natural language descriptions of capability nodes in embodiments herein. This semantic similarity comparison may be a semantic cosine similarity comparison or other suitable semantic similarity algorithm and a TF-IDF lexical comparison may be via a BM25 algorithm or other suitable lexical comparison in embodiments herein. This IF-TDF weighted semantic similarity comparison may be conducted on capability nodes until each capability node of the hierarchical capabilities tree has received a TF-IDF weighted semantic cosine similarity search score in some embodiments. As described herein, several different methods exist for traversing a hierarchical tree as shown in FIG. 6, to determine a cosine semantic similarity score or TF-IDF score for each capability node within the tree to determine a best match capability node. In some cases, a depth-first search may be used, which analyzes all of the nodes within a vertical lineage of parent-child relationships down to a single child node. This may eliminate capability nodes in entire branches of the hierarchical capabilities tree from being compared when a higher parent capability node has a low correlation in a TF-IDF weighted semantic cosine similarity search score to the user query input. For example, the vectorized user query input intent value and each of several capability intent values for capability nodes may each be compared using a semantic search approach, such as a cosine similarity search or comparison. Thus, a single user query input may be compared to a plurality of natural language capabilities for AI productivity tool enableable software applications, with each capability node of the hierarchical capabilities decision tree compared representing a capability in a branch that is assessed.

More specifically, in a depth-first approach, for each natural language capability at a first level of the hierarchical capabilities decision tree, a TF-IDF weighted cosine semantic similarity search score could be determined that compares the vectorized user query input intent value and the capability intent values for the natural language descriptions of the capabilities at the first level. A parent best match capability node (e.g., 683b for "Accounts") having a highest TF-IDF weighted cosine semantic similarity search score among the natural language capabilities at the first level of the hierarchical capabilities decision tree could then be identified. In a depth-first tree-traversal methodology a TF-IDF weighted cosine semantic similarity search score only for the children of the capability natural language description identified as the parent best match capability (e.g., 683b) for the previous level of the hierarchical capabilities decision tree may then be later considered as a candidate best match capability to address the user's request within the received user query input. Comparison of TF-IDF weighted cosine semantic similarity search scores in such a depth-first approach may be limited at each level of the hierarchical capabilities decision tree to children of the natural language description of the capability node (e.g., 683b) at the previous level having a capability intent value generating a highest TF-IDF weighted cosine semantic similarity search score. This depth-first tree-traversal methodology may consistently narrow the focus of comparisons between the query input intent value and the plurality of capability intent values to natural language descriptions of increasing specificity. As a consequence, there is a risk that the range of capabilities considered as candidates for fulfilling the user's request within the received user query input may narrow too quickly, or become too specific too quickly. For example, if the user input query 681 were "reset password for locked email account" rather than "reset password for locked account" as shown, the depth-first tree-traversal could miss the capability node 687b for "Outlook password." In other words, the depth-first tree-traversal methodology may increase computing speed at the expense of accuracy in determining the best possible match across all capabilities of the hierarchical capabilities decision tree by narrowing focus to a particular parent-child lineage of the hierarchical capabilities decision tree too early in the process of traversing the hierarchical capabilities decision tree.

Embodiments of the present disclosure overcome this issue by using a breadth-first tree-traversal methodology, rather than a depth-first tree-traversal methodology, to comprehensively consider every capability node within the hierarchical capabilities decision tree as a candidate for a best match capability for meeting the user's request within the received user query input. In other embodiments, a modified breadth-first tree traversal methodology may be used where first level patent capability nodes with a low correlation, such as below a threshold TF-IDF weighted semantic search comparison score, eliminates certain branches of the hierarchical capabilities decision tree. The hardware processor executing machine readable code instructions of the query intent to capabilities determination module of the OTB AI productivity tool in an embodiment may perform such a breadth-first tree-traversal methodology by determining a TF-IDF weighted cosine semantic similarity search score for each node within a highest level of the hierarchical capabilities decision tree. For example, the hardware processor executing machine readable code instructions of the query intent to capabilities determination module of the OTB AI productivity tool in an embodiment may determine a TF-IDF weighted cosine semantic similarity search score at node 683a of 1.65, as described in greater detail above with respect to FIG. 5 at 594a, for the natural language descriptor "operating system." As another example, the hardware processor executing machine readable code instructions of the query intent to capabilities determination module of the OTB AI productivity tool in an embodiment may determine a TF-IDF weighted cosine semantic similarity search score at node 683b of 3.46, as described in greater detail above with respect to FIG. 5 at 594*b*, for the natural language descriptor "accounts." In yet another example, the hardware processor executing machine readable code instructions of the query intent to capabilities determination module of the OTB AI productivity tool in an embodiment may determine a TF-IDF weighted cosine semantic similarity search score at node 683*c* of 1.1, as described in greater detail above with respect to FIG. 5 at 594*c*, for the natural language descriptor "display."

Upon making such a determination for each capability node of the highest level, the hardware processor executing machine readable code instructions of the query intent to capabilities determination module of the OTB AI productivity tool in an embodiment may then determine a TF-IDF weighted cosine semantic similarity search score for each node within the next-highest level of the hierarchical capabilities decision tree. For example, the hardware processor executing machine readable code instructions of the query intent to capabilities determination module of the OTB AI productivity tool in an embodiment may determine a TF-IDF weighted cosine semantic similarity search score at node 685*a* of 2.3 for the natural language descriptor "password." As another example, the hardware processor executing machine readable code instructions of the query intent to capabilities determination module of the OTB AI productivity tool in an embodiment may determine a TF-IDF weighted cosine semantic similarity search score at node 685*b* of 1.34 for the natural language descriptor "update." In yet another example, the hardware processor executing machine readable code instructions of the query intent to capabilities determination module of the OTB AI productivity tool in an embodiment may determine a TF-IDF weighted cosine semantic similarity search score at node 685*c* of 1.27 for the natural language descriptor "add new account." As yet another example, the hardware processor executing machine readable code instructions of the query intent to capabilities determination module of the OTB AI productivity tool in an embodiment may determine a TF-IDF weighted cosine semantic similarity search score at node 685*d* of 4.81 for the natural language descriptor "account password issues."

This approach may continue for each of the levels of the hierarchical capabilities decision tree until the hardware processor executing machine readable code instructions of the OTB AI productivity tool in an embodiment has determined a TF-IDF weighted cosine semantic similarity search score for every node within the hierarchical capabilities decision tree, thus providing a comprehensive scoring for every possible capability represented within the hierarchical capabilities decision tree. For example, the hardware processor executing machine readable code instructions of the query intent to capabilities determination module of the OTB AI productivity tool in an embodiment may determine a TF-IDF weighted cosine semantic similarity search score at node 687*a* of 2.12 for the natural language descriptor "Windows password." As another example, the hardware processor executing machine readable code instructions of the query intent to capabilities determination module of the OTB AI productivity tool in an embodiment may determine a TF-IDF weighted cosine semantic similarity search score at node 687*b* of 2.13 for the natural language descriptor "Outlook password." In yet another example, the hardware processor executing machine readable code instructions of the query intent to capabilities determination module of the OTB AI productivity tool in an embodiment may determine a TF-IDF weighted cosine semantic similarity search score at node 687*c* of 7.23 for the natural language descriptor "reset password for locked account." As yet another example, the hardware processor executing machine readable code instructions of the query intent to capabilities determination module of the OTB AI productivity tool in an embodiment may determine a TF-IDF weighted cosine semantic similarity search score at node 687*d* of 3.96 for the natural language descriptor "account recovery." In embodiments herein, the breadth-first tree traversal algorithm may assess these TF-IDF weighted cosine semantic similarity search scores for childless capability nodes (e.g., 687*a*, 687*b*, 687*c*, 687*d*, 685*b*, 685*c*, and 683*c* in the shown example) of the hierarchical to determine a highest TF-IDF weighted cosine semantic similarity search score to identify a best match capability from such a capability node.

In some other embodiments, this independent TF-IDF weighted cosine similarity search score determined for these capability nodes 683*a*, 683*b*, 683*c*, 685*a*, 685*b*, 685*c*, 685*d*, 687*a*, 687*b*, 687*c*, and 687*d* may be further weighted in some embodiments by the TF-IDF weighted cosine similarity search score of the respective previous level parent capability nodes to yield a parent and TF-IDF weighted cosign similarity search score. For example, the independent TF-IDF weighted cosine similarity search score of 2.3 determined for the capability node 685*a* may be further weighted in an embodiment by the TF-IDF weighted cosine similarity search score of 1.65 for the immediate parent capability node 683*a* by multiplying these values together to provide a parent and TF-IDF weighted cosign similarity search score of 3.795 for the natural language descriptor "password." As another example, the independent TF-IDF weighted cosine similarity search score of 1.34 determined for the capability node 685*b* may be further weighted in an embodiment by the TF-IDF weighted cosine similarity search score of 1.65 for the immediate parent capability node 683*a* by multiplying these values together to provide a parent and TF-IDF weighted cosign similarity search score of 2.21 for the natural language descriptor "update." In another example, the independent TF-IDF weighted cosine similarity search score of 1.27 determined for the capability node 685*c* may be further weighted in an embodiment by the TF-IDF weighted cosine similarity search score of 3.46 for the immediate capability node 683*b* by multiplying these values together to provide a parent and TF-IDF weighted cosign similarity search score of 4.394 for the natural language descriptor "add new account." As yet another example, the independent TF-IDF weighted cosine similarity search score of 4.81 determined for the capability node 685*d* may be further weighted in an embodiment by the TF-IDF weighted cosine similarity search score of 3.46 for the immediate parent capability node 683*b* by multiplying these values together to provide a parent and TF-IDF weighted cosign similarity search score of 16.64 for the natural language descriptor "account password issues."

This approach may continue through traversal of each level of the hierarchical capabilities decision tree in an embodiment. For example, the independent TF-IDF weighted cosine similarity search score of 2.12 determined for the capability nodes 687*a* may be further weighted in an embodiment by the parent and TF-IDF weighted cosine similarity search score of 3.795 for the immediate parent capability node 685*a* by multiplying these values together to provide a parent and TF-IDF weighted cosign similarity search score of 8.05 for the natural language descriptor "Windows password." As another example, the independent TF-IDF weighted cosine similarity search score of 2.13 determined for the capability nodes 687*b* may be further weighted in an embodiment by the parent and TF-IDF weighted cosine similarity search score of 3.795 for the immediate parent capability node 685*a* by multiplying these values together to provide a parent and TF-IDF weighted cosign similarity search score of 8.08 for the natural language descriptor "Outlook password." In yet another example, the independent TF-IDF weighted cosine similarity search score of 7.23 determined for the capability nodes 687*c* may be further weighted in an embodiment by the parent and TF-IDF weighted cosine similarity search score of 16.64 for the immediate parent capability node 685*d* by multiplying these values together to provide a parent and TF-IDF weighted cosign similarity search score of 120.3 for the natural language descriptor "reset password for locked account." In still another example, the independent TF-IDF weighted cosine similarity search score of 3.96 determined for the capability nodes 687*d* may be further weighted in an embodiment by the parent and TF-IDF weighted cosine similarity search score of 16.64 for the immediate parent capability node 685*d* by multiplying these values together to provide a parent and TF-IDF weighted cosign similarity search score of 65.9 for the natural language descriptor "account recovery." In other embodiments herein, the breadth-first tree traversal algorithm may assess these parent and TF-IDF weighted cosine semantic similarity search scores for childless capability nodes (e.g., 687*a*, 687*b*, 687*c*, 687*d*, 685*b*, 685*c*, and 683*c* in the shown example) of the hierarchical to determine a highest parent and TF-IDF weighted cosine semantic similarity search score to identify a best match capability from such a capability node and taking into account relatedness of parent capability nodes.

The hardware processor executing machine readable code instructions of the OTB AI productivity tool in an embodiment may then identify a best match capability associated with a childless capability node, or a capability node at a bottom branch of the hierarchical capabilities decision tree having a highest TF-IDF weighted cosine semantic similarity search score in comparison to only other childless capability nodes within the hierarchical capabilities decision tree in an embodiment. The hierarchical capabilities decision tree depicted in FIG. 6, for example, includes seven different childless nodes, including 683*c*, 685*b*, 685*c*, 687*a*, 687*b*, 687*c*, and 687*d*. In an example embodiment, the hardware processor executing machine readable code instructions of the OTB AI productivity tool may identify a best match capability associated with childless capability node 687*c* having a TF-IDF weighted cosine semantic similarity search score of 7.23 for the natural language descriptor "reset password for locked account" that is higher than the other TF-IDF weighted cosine semantic similarity search scores of 1.1, 1.34, 1.27, 2.12, 2.13, and 3.96 for capability nodes 683*c*, 685*b*, 685*c*, 687*a*, 687*b*, and 687*d*, respectively. In another example embodiment in which TF-IDF weighted cosine semantic similarity search scores are further weighted by parent scores, the hardware processor executing machine readable code instructions of the OTB AI productivity tool may identify a best match capability associated with childless capability node 687*c* having a parent score and TF-IDF weighted cosine semantic similarity search score of 120.3 for the natural language descriptor "reset password for locked account" that is higher than the other parent score and TF-IDF weighted cosine semantic similarity search scores of 1.1, 1.34, 4.394, 8.05, 8.08, and 65.9 for nodes 683*c*, 685*b*, 685*c*, 687*a*, 687*b*, and 687*d*, respectively. In such a way, the hardware processor 102 executing machine readable code instructions of the OTB AI productivity tool 150 in an embodiment may overcome or lessen the impacts of overly narrow focus on particular lineages of the hierarchical capabilities decision tree encountered by a depth-first tree-traversal methodology, and may enhance semantic search performance by also considering critical keywords when determining a matching capability of an AI productivity tool enableable software application that is most likely to address the user's intent within the user query input.

Figure 7:
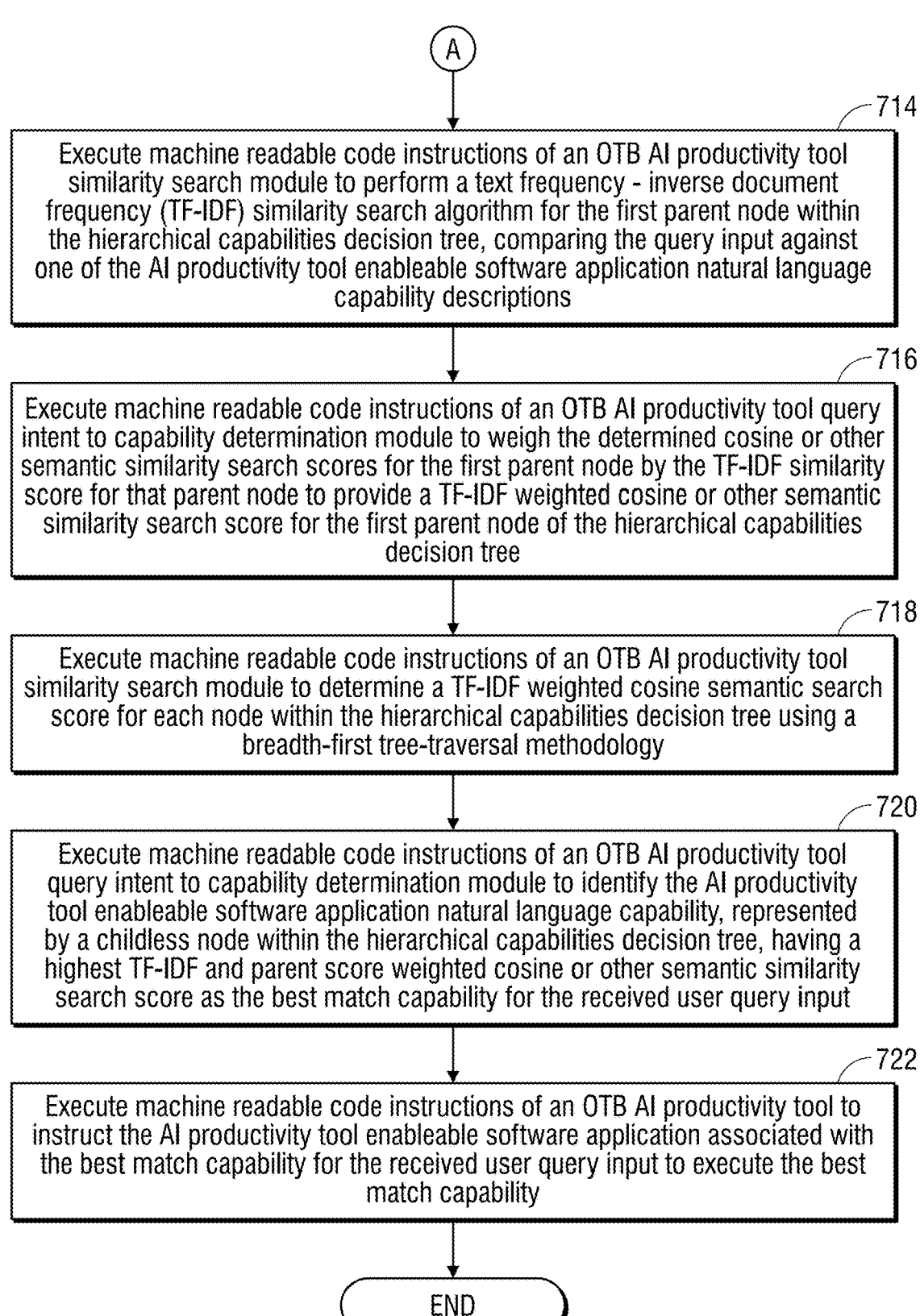
FIG. 7 is a flowchart showing a method of executing computer readable code instructions of modules of an OTB AI productivity tool to identify a capability that best matches a received user query input through comprehensive keyword sensitive semantic similarity search algorithms, such as a TF-IDF weighted cosine semantic similarity search score algorithm, for each childless capability node within a capabilities decision tree according to an embodiment of the present disclosure.

FIG. 7 is a flowchart showing a method of executing computer readable code instructions of modules of an OTB AI productivity tool to identify a capability that best matches a received user query input through breadth-first, keyword-sensitive semantic similarity search algorithms such as a breadth-first TF-IDF weighted cosine semantic similarity search score algorithm, for each childless capability node within a capabilities decision tree according to an embodiment of the present disclosure. It is appreciated that the method 700 described herein may be executed via execution of computer readable program code instructions in firmware or software by a hardware processor or other hardware processing device on an information handling system.

The method 700 may include, at block 702, executing computer-readable program code instructions of a capabilities gathering module via a hardware processor, hardware controller or other hardware processing resource to gather capabilities associated with each of a plurality of AI productivity tool-enablable software applications. These capabilities gathered by The capabilities gathering module may include any input and output capabilities provided by the AI productivity tool-enablable software applications being executed or to be executed by the hardware processor or any other hardware processing devices of an information handling system. For example, an AI productivity tool-enablable software application may include a word processing application such as Microsoft® Word® that may receive input (e.g., via voice at a microphone or text via a keyboard) and provide output via text. Still further, other examples of an AI productivity tool-enablable software application may include a software updating system, virus protection software, and setting optimization software such as Dell® SupportAssist® module that are code instructions executable by the hardware processor or other hardware processing resource of the information handling system. With SupportAssist®, a user may provide input via, for example, the microphone requesting information related to a setting associated with the information handling system. Thus, capabilities of SupportAssist® may include virus protection capabilities, setting manipulation capabilities, and software updating capabilities that may each be detected and gathered via the execution of the capabilities gathering module for use and categorization of these capabilities as described herein.

Even further, examples of an AI productivity tool-enablable software application may include Dell® Display®/Peripheral Manager®. The Dell® Display®/Peripheral Manager® may be computer-readable program code instructions that have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® subagent may be gathered by the capabilities gathering module for later determination of capability vector intent values and categorization as described herein. It is appreciated that any AI productivity tool-enablable software application of computer-readable program code instructions in software, firmware, or some combination that may publish or provide a listing of capabilities to be gathered by the capabilities gathering module. For example, each AI productivity tool-enablable software application publish or have assigned to it one or more descriptor terms or phrases for capabilities of the AI productivity tool-enablable software application for use with an OTB AI productivity tool, such as for with a chatbot natural language system. Further examples of AI productivity tool-enablable applications may include, for example, Dell® Trusted Device® application, a remediation Dell® APEX Managed Device Service (AMDS)® AI productivity tool-enablable software application, Alienware Command Center (AWCC)® AI productivity tool-enablable software application, among others. The capabilities of each of these AI productivity tool-enablable software applications, including descriptors associated with those capabilities, may be gathered via execution, by the hardware processor or any other hardware processing device, of the capabilities gathering module.

As described in an embodiment with respect to FIG. 3, the natural language descriptions of capabilities for the AI productivity tool enableable software applications in an embodiment may be organized into a hierarchical capabilities decision tree 390 that maps logical parent-child relationships established by an ITDM between and among the plurality of natural language descriptions of capabilities at capability nodes in this hierarchical capabilities decision tree 390 in an embodiment. The hierarchical capabilities decision tree 390 may include the plurality of gathered capabilities and stored in a natural language capability database on the information handling system. Each capability node of this hierarchical capabilities decision tree 390 in an embodiment may have the same data fields, including a capability name, capability identification (ID) (e.g., in alphanumeric values), and a natural language description or phrase therewithin of the capability, capability intent value, and metadata or other data for the capability including designation of parent or child relationships. For example, a query input with a query intent value at 391 may be subject for a cosine semantic similarity search comparison algorithm with one or more branches of the hierarchical capabilities decision tree 390 having parent and child capability nodes 393a, 393b, 393c at a first level 392, capability nodes 395a, 395b, 395c, 395d at a second level 394, and capability nodes 397a, 397b, 397c, and 397d at a third level 396 of the hierarchical capabilities decision tree 390 in an embodiment. Each capability node in the hierarchical capabilities decision tree 390 may include a capability name, a capability ID, an associated capability vector intent value, and other metadata or data relating to the capability such as parent/child designations or associated AI productivity tool enableable software application of the capability. Each of the capability nodes 393a, 393b, 393c, 393d, 395a, 395b, 395c, 395d, 397a, 397b, 397c, and 397d in the hierarchical capabilities decision tree 390 may include a natural language description phrases of as shown for "Operating System," "accounts," "display," "password," "update," "add an account," "account password issues," "windows password," "Outlook password," "reset password for locked account," and "account recovery," respectively.

The hierarchical capabilities decision tree 390 in an embodiment may identify child capability nodes having capability natural language descriptions or phrases therewithin as providing greater specificity than its identified parent capability natural language description or phrases within the hierarchical capabilities decision tree 390. For example, a first level parent capability node 393b for a capability natural language description phrase such as "accounts" may have second level child capability nodes 395c and 395d for capability natural language description phrases, including "add an account," and "account password issues," respectively. At a second level 394 of the hierarchical capabilities decision tree 390 a now-parent second level capability node 395d for a capability natural language description phrase such as "account password issues" may further have two third level child nodes 397c and 397d for capability natural language description phrases, including "reset password for locked account," and "account recovery," respectively, with each child node, such as second level child capability nodes 395d and 395c, and third level child capability nodes 397c and 397d providing a more specific capabilities related to the first level parent node 393ba phrase "accounts."

In embodiments herein, semantic similarity search comparison of a query input such as 391 may occur according to a breadth-first or modified breadth-first tree traversal algorithm but may begin across three first level parent capability nodes 393a, 393b, and 393b for capability natural language description phrases, including "Operating System," and "accounts," and "display," respectively, that form root or primary capability nodes for branches of the hierarchical capabilities decision tree 390. Parent capability nodes for capability natural language descriptions or phrases may be separated from child capability nodes for capability natural language descriptions or phrases within the hierarchical capabilities decision tree 390 in an embodiment by such branches, such as those shown beginning with first level capability parent capability nodes 393a, 393b, and 393b. Each level of the hierarchical capabilities decision tree 390 may thus include one or more nodes identified as a child, and connected via a branch to one of the nodes in the previous level of the hierarchical capabilities decision tree. Each capability natural language description or phrase identified as a child in such a way within the hierarchical capabilities decision tree 390 may include an identification of its parent node or parent capability natural language description/ phrase.

At block 704, the method 700 includes an information handling system hardware processor, hardware controller, or other hardware processing resource executing computer-readable program code of the capability intent value generator to generate capability intent values with execution of a text embedding machine learning model for association with the natural language descriptions or descriptors for those gathered capabilities associated with each of a plurality of AI productivity tool-enablable software applications. Execution of computer-readable program code of the capability intent value generator may cause the specific words, sets of words, phrases, or order of word usage associated with the natural language descriptors of capabilities of each of the AI productivity tool-enablable software applications described herein to be used to generate vectorized capability intent values for those capabilities. For example, a capability intent value for association with the natural language description of the various capabilities associated with the Dell® SupportAssist® may include descriptors such as "virus protection," "updating," "update," "settings," "settings optimization," and the like that describe these capabilities. Similar or other descriptors may be associated with a plurality of other capabilities for additional AI productivity tool-enablable software applications in embodiments herein. Each of these capability intent vector values for association with the natural language descriptions of these capabilities and their capability intent vector values may also be associated with a capability ID such as an alphanumeric ID that may identify, uniquely, these capabilities for storage in a database for example or for publication, storage, and use with embodiments herein.

As a specific example, the hardware processor executing machine readable code instructions for a capability intent value generator of the OTB AI productivity tool may determine capability intent values associated with natural language descriptions of the gathered capabilities for each of a plurality of AI productivity tool-enablable software applications. These capability intent values for each capability may be stored with each capability node within the hierarchical capabilities decision tree at the natural language capability database.

The capability intent values are a mathematical representation of the natural language descriptions of capability operations or services from various AI productivity tool-enablable software applications in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a natural language capability database. These capabilities stored at the natural language capability database may include any input and output capabilities provided by the AI productivity tool-enablable software applications being executed by the hardware processor or any other hardware processing devices.

At block 706, a user in an embodiment may provide a user query input requesting, in natural language, an action or response by the information handling system via the universal user conversational interface software application or other interface (e.g., specific for an AI productivity tool enableable software application). For example, a user may provide text or voice data (e.g., via IO device 116, or microphone 118 of FIG. 1) to a universal user conversational interface, operating as a chatbot to simulate a conversation between the user and any of several AI productivity tool enableable software applications.

The hardware processor in an embodiment at block 708 may execute machine readable code instructions of a universal user conversational interface software application or other interface to transmit the user query input to the OTB AI productivity tool for matching a user requested action in a user query input with natural language capabilities of the AI productivity tool enableable software application. For example, in an embodiment described at FIG. 2, once the capabilities have been gathered (e.g., at block 702) at natural language capabilities database 255, the hardware processor 202 executing machine readable code instructions of the OTB AI productivity tool 250 in an embodiment may receive a user query input, via the universal user conversational interface software application 270 or other interface requesting that an action be taken at the information handling system. The OTB AI productivity tool 250 may later use machine-learning algorithms to determine a capability stored at the natural language capability database 255 for an AI productivity tool enableable software application 211, that can address the request in the user query input, as described further below.

At block 710, the hardware processor in an embodiment may execute machine readable code instructions of an OTB AI productivity tool text embedding module to generate a vector query intent value for the received user query input. For example, in an embodiment in which the user provides a user query input in the form of voice data to the AI productivity tool enableable software application 211 via the OTB AI productivity tool 250 and the universal software application conversation interface 270, the hardware processor 202 executing machine-readable code instructions of an automated speech recognition (ASR) module 263 to detect words within the recorded voice data. The hardware processor 202 may also execute machine readable code instructions of a text embedding module 265 to detect which of these words are nouns, verbs, or commonly used sentence structures and generate a vectorized query input intent value for the user query input.

As also described in an example embodiment with respect to FIG. 4, the natural language capabilities for a plurality of AI productivity tool enableable software applications are provided text descriptors that may be processed into capability intent values, such as 481, in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, one or more axes may represent a reader's understanding of a given text excerpt may depend upon the reader's knowledge of any given word's meaning within the text, identified phrases within the text, or the understood order or sequence of words within the text. More specifically, one or more axes may represent that the reader's understanding is enhanced by the reader having a larger vocabulary and understanding of which words in that vocabulary are synonyms (closer in meaning) to a given word in that text, and which words are antonyms (further away in meaning) to that given word. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies, (as determined through TF-IDF comparison), but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor in an embodiment at block 712 may execute machine readable code instructions to determine a cosine semantic search score for a first parent capability node within the hierarchical capabilities decision tree, comparing the vectorized query input intent value against a capability intent value associated with an AI productivity tool enableable software application natural language capability description. For example, in an embodiment described with reference to FIG. 4, the hardware processor executing machine readable code instructions for a semantic search machine learning model of the similarity search module (e.g., 280 of FIG. 2) may determine that the phrase "operating system" has a cosine similarity search score 483*a* of 0.5 when compared against the query input intent value for the query input intent "reset password for locked account." In another example, the hardware processor executing machine readable code instructions for a semantic search machine learning model of the similarity search module may determine that the phrase "accounts" has a cosine similarity search score 483*b* of 0.745 when compared against the query input intent value for the query input intent "reset password for locked account." In still another example, the hardware processor executing machine readable code instructions for a semantic search machine learning model of the similarity search module may determine that the phrase "display" has a cosine similarity search score 483*c* of 0.1 when compared against the query input intent value for the query input intent "reset password for locked account."

Such a comparison may be performed using a semantic search machine learning model, such as a cosine similarity search algorithm, that compares the distance or vector value differences in a multi-axis vector space between two vectors (e.g., a query vector intent value 481 and one of vector capability intent values 482*a*, 482*b*, and 482*c*) to determine the contextual similarity between the natural language description of the capabilities having the capability intent values 482*a* to 482*c* and the natural language user query input having the user query input intent value 481. This semantic similarity search comparison may be executed for several of the capability intent values of capability nodes across the hierarchical capabilities decision tree, such as shown in FIG. 6, according to a breadth-first tree traversal algorithm to compare the query intent value to capability intent values of those capability nodes in the hierarchical capabilities decision tree. This may include conducting a semantic similarity comparison of the query intent value down each of the branches of the hierarchical capabilities decision tree until a lowest, childless capability node has been reached for comparison in each branch in embodiments herein. Additionally, for each capability node in the hierarchical capabilities decision tree, a lexical comparison of the natural language of the user query input may also be compared to the natural language description of each capability in each capability node as described below in block 714. This may be done simultaneously or sequentially.

In an embodiment at block 714, machine readable code instructions of an OTB AI productivity tool similarity search module may be executed to perform a text frequency-inverse document frequency (TF-IDF) similarity search algorithm for the capability nodes within the hierarchical capabilities decision tree, comparing the query input against each of the AI productivity tool enableable software application natural language capability descriptions in the capability nodes of the hierarchical capabilities decision tree. More specifically, the hardware processor executing code instructions for a TF-IDF algorithm may determine a TF-IDF similarity score 593*a* of 0.1 measuring the frequency with which each of a plurality of natural language terms appear in the user query input 591 of "reset password for locked account," as weighted by the frequency with which each of those terms also occur within the natural language capability 592*a* of "operating system." As another example, the hardware processor executing code instructions for a TF-IDF algorithm may determine a TF-IDF similarity score 593*b* of 0.98 measuring the frequency with which each of a plurality of natural language terms appear in the user query input 591 of "reset password for locked account," as weighted by the frequency with which each of those terms occur within the natural language capability 592*b* of "accounts." In yet another example, the hardware processor executing code instructions for a TF-IDF algorithm may determine a TF-IDF similarity score 593*c* of 0.001 measuring the frequency with which each of a plurality of natural language terms appear in the user query input 591 of "reset password for locked account," as weighted by the frequency with which each of those terms occur within the natural language capability 592*c* of "display." Such a TF-IDF similarity search score is used to weigh the semantic similarity search score, such as a semantic cosine similarity search score, for the correlation of each capability intent value with the query intent value for the user query input.

The hardware processor in an embodiment at block 716 may execute machine readable code instructions of an OTB AI productivity tool query intent to capability determination module to weigh the determined cosine or other semantic similarity search scores for the AI productivity tool enableable software application natural language capability description for the first parent node by the TF-IDF similarity score for that AI productivity tool enableable software application natural language capability description. This may provide a TF-IDF weighted cosine or other semantic similarity search score for the AI productivity tool enableable software application natural language capability description for the first parent node in the first level of the hierarchical capabilities decision tree. As described below, this weighting of cosine or other semantic similarly comparison score may be weighted by the TF-IDF comparison score for each of the nodes in a hierarchical capabilities decision tree.

At block 716, in an embodiment described with reference to FIG. 5, the cosine similarity search score determined at block 712 above may then be weighted by a TF-IDF similarity score (e.g., 593*a*) determined in block 714, in order to increase the accuracy of the cosine similarity or other semantic search score 583*a* in determining when a capability (e.g., 592*a*) of a capability node for an AI productivity tool enableable software application may address the user's request within the received user query input 591. For example, the hardware processor executing code instructions for the similarity search module may perform a TF-IDF algorithm to measure the frequency with which each of a plurality of natural language terms appear within the user query input 591, as weighted by the frequency with which that term occurs in one of the natural language capabilities (e.g., 592*a*) stored within the natural language capabilities database 555. For example, a TF-IDF weighted cosine or other semantic similarity search score 594*a* of 1.65 may be determined by a hardware processor executing code instructions of the query intent to capability determination module as equivalent to one plus the cosine or other semantic similarity search score 583*a* of 0.5, multiplied by one plus the TF-IDF similarity search score 593*a* of 0.1. In still another example embodiment, a TF-IDF weighted cosine or other semantic similarity search score 594*b* of 3.46 may be determined by a hardware processor executing code instructions of the query intent to capability determination module as equivalent to one plus the cosine or other semantic similarity search score 583*b* of 0.745, multiplied by one plus the TF-IDF similarity search score 593*b* of 0.98. In yet another example embodiment, a TF-IDF weighted cosine or other semantic similarity search score 594*c* of 0.1 may be determined by a hardware processor executing code instructions of the query intent to capability determination module as equivalent to one plus the cosine or other semantic similarity search score 583*c* of 0.1, multiplied by one plus the TF-IDF similarity search score 593*c* of 0.001.

A hardware processor in an embodiment at block 718 may execute machine readable code instructions to determine a TF-IDF weighted cosine semantic search score for each capability node within the hierarchical capabilities decision tree using a breadth-first tree-traversal algorithm. The TF-IDF weighted cosine semantic search score compares the vectorized query input intent value against a plurality of capability intent values in a cosine semantic search comparison, each associated with an AI productivity tool enableable software application natural language capability description and is weighted by a TF-IDF lexical comparison similarity score comparing natural language of the user query input and natural language description of each capability node. For example, the process of blocks 712, 714 and 716 above may be repeated for each of the natural language capabilities of capability nodes stored within each given level of the hierarchical capabilities decision tree of the natural language capabilities database to produce a TF-IDF similarity search scores for each capability node. Further, this may be repeated for each capability node of each level of the hierarchical capabilities decision tree in natural language capabilities database. The breadth-first tree-traversal algorithm used may generate comparisons for all capability nodes in each assessed branch of the hierarchical capabilities decision tree for TF-IDF weighted cosine semantic search scores at each capability node in embodiments herein by traversing down each branch until lowest-level childless capability nodes of those branches are reached for such comparison in embodiments herein. Then the capability nodes of the next branch to be assessed are similarly compared for TF-IDF weighted cosine semantic search scores down to the lowest level childless capability nodes. In some embodiments, a modified breadth-first tree-traversal algorithm may be used in which parent capability nodes of a branch having a very low TF-IDF weighted cosine semantic search score and correlation to the user input query may not be further compared to save processing time and resources, but nodes in the other branches are compared as described.

In another example embodiment, the TF-IDF weighted cosine semantic search score for each capability node may be further weighted by the TF-IDF weighted cosine semantic search score of its parent capability node, if it is not a root capability node of a branch or tree, in the hierarchical capabilities decision tree as described in embodiments herein such as with FIG. 6. This parent and TF-IDF weighted cosine semantic search score may then be used to weigh the next child capability node in the branch if a child exists. If no further child node exists, this parent and TF-IDF weighted cosine semantic search score for the childless node may be compared to other parent and TF-IDF weighted cosine semantic search score for other childless nodes in the hierarchical capabilities decision tree to determine a best match capability having a highest parent and TF-IDF weighted cosine semantic search score according to some embodiments herein.

In an embodiment at block 720, a hardware processor may execute machine readable code instructions of an OTB AI productivity tool query intent to capability determination module to identify the AI productivity tool enableable software application natural language capability, represented by a childless capability node within the hierarchical capabilities decision tree, having a highest TF-IDF weighted cosine or other semantic similarity search score as the best match capability for the received user query input. For example, in an embodiment described with reference to FIG. 6, the hardware processor executing machine readable code instructions of the OTB AI productivity tool in an embodiment may identify a best match capability associated with a childless capability node, or a node at a bottom branch of the hierarchical capabilities decision tree having a highest TF-IDF weighted cosine semantic similarity search score in comparison to only other childless capability nodes within the hierarchical capabilities decision tree. The hierarchical capabilities decision tree depicted in FIG. 6, for example, includes seven different childless capability nodes, including 683*c*, 685*b*, 685*c*, 687*a*, 687*b*, 687*c*, and 687*d*. Thus, a capability may then be identified that correlates and is responsive to the received user query input in embodiments herein. In an example embodiment, the hardware processor executing machine readable code instructions of the OTB AI productivity tool may identify a best match capability associated with childless node 687*c* having a TF-IDF weighted cosine semantic similarity search score of 7.23 for the natural language descriptor "reset password for locked account" that is higher than the other TF-IDF weighted cosine semantic similarity search scores of 1.1, 1.34, 1.27, 2.12, 2.13, and 3.96 for nodes 683*c*, 685*b*, 685*c*, 687*a*, 687*b*, and 687*d*, respectively.

In another example embodiment in which TF-IDF weighted cosine semantic similarity search scores are further weighted by parent scores, the hardware processor executing machine readable code instructions of the OTB AI productivity tool may identify a best match capability associated with childless node 687c having a parent score and TF-IDF weighted cosine semantic similarity search score of 120.3 for the natural language descriptor "reset password for locked account" that is higher than the other parent score and TF-IDF weighted cosine semantic similarity search scores of 1.1, 1.34, 4.394, 8.05, 8.08, and 65.9 for nodes 683c, 685b, 685c, 687a, 687b, and 687d, respectively. In such a way, the hardware processor 102 executing machine readable code instructions of the OTB AI productivity tool 150 in an embodiment may overcome or lessen the impacts of overly narrow focus on particular lineages of the hierarchical capabilities decision tree encountered by a depth-first tree-traversal methodology, and may enhance semantic search performance by also considering critical keywords when determining a matching capability of an AI productivity tool enableable software application that is most likely to address the user's intent within the user query input.

The hardware processor in an embodiment at block 722 may execute machine readable code instructions of an OTB AI productivity tool to instruct the AI productivity tool enableable software application associated with the best match capability for the received user query input to execute the best match capability. In an example embodiment, the hardware processor executing machine readable code instructions of the OTB AI productivity tool determines that the best match capability has the natural language capability description of "reset password for locked account" and either the highest TF-IDF weighted cosine semantic similarity search score of 7.23 or the highest parent and TF-IDF weighted cosine semantic similarity search score of 120.3. In such an example embodiment, the hardware processor may execute machine readable code instructions of the OTB AI productivity tool to instruct the AI productivity tool enableable software application 211 to execute the capability identified within the node 685c of FIG. 6 for the phrase "reset password for locked account" in response to the query "reset my password for a locked account."

Thus, the hardware processor of the information handling system may respond to a user input query with an artificial intelligence responsive action to execute machine readable code instructions the AI productivity tool enableable software application associated with the best match capability for the received user query input to execute the best match capability. For example, the hardware processor may execute machine readable code instructions the AI productivity tool enableable software application associated with the best match capability node in response to the received user query input and determined from a hierarchical capabilities decision tree storing gathered capabilities. The method for identifying a capability of an AI productivity tool enableable software application that best matches a received user query input through a breath-first, keyword-sensitive TF-IDF weighted semantic search that considers a cosine semantic similarity search score and a TF-IDF score for a subset of capabilities within a capabilities decision tree may then end.

The blocks of the flow diagram of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer readable code instructions for an on the box (OTB) artificial intelligence (AI) productivity tool comprising:

a natural language capabilities database memory to store natural language descriptions of capabilities associated with each of a plurality of AI productivity tool-enablable software applications executing on the information handling system in a capabilities decision tree with each capability stored under a plurality of branches as a capability node grouped under a branch of the capabilities decision tree according to logical topics in hierarchical parent-child relationships, wherein metadata for each capability node identifies a child capability node or parent capability node of the capability node;

a hardware processor executing computer-readable program code instructions of the OTB AI productivity tool to generate capability intent values from the natural language descriptions of the capabilities and store the capability intent values with the capability nodes;

the hardware processor executing computer-readable program code instructions to generate a query input intent value from a user query input received via text or audio requesting a response by one of the plurality of AI productivity tool-enableable software applications;

the hardware processor executing computer-readable program code instructions to perform a breadth-first text frequency-inverted document frequency (TF-IDF) weighted cosine semantic similarity search comparing the capability intent values of each of the capability nodes in the capabilities decision tree as a semantic similarity comparison, as weighted by a TF-IDF comparison between natural language of the user query input and each of the natural language descriptions of capabilities of each of the capability nodes to identify a best match childless capability node in the capabilities decision tree having a highest TF-IDF weighted cosine semantic similarity search score with the query input intent value; and the hardware processor executing computer-readable program code instructions for a best match capability from the best match childless capability node with a first AI productivity tool-enableable software application in response to the user query input.

2. The information handling system of claim 1 wherein the TF-IDF comparison is a best match 25 (BM25) algorithm.

3. The information handling system of claim 1 wherein computer-readable program code instructions of a latent semantic analysis text embedding algorithm are executed via the hardware processor for generating the capability intent values and the query input intent value wherein the TF-IDF comparison is a best match 25 with fields (BM-25F) algorithm.

4. The information handling system of claim 1, wherein the breadth-first TF-IDF weighted cosine semantic similarity search includes a parent score and TF-IDF weighted cosine semantic similarity search that generates, for each child capability node, a parent and TF-IDF weighted cosine similarity search score that is weighted by the TF-IDF weighted cosine similarity search score determined for the parent capability node of that child capability node.

5. The information handling system of claim 1 further comprising:

the hardware processor executing computer-readable program code instructions of the first AI productivity tool-enablable software application to execute the best match capability to automatically execute changes to or update one or more local software applications in response to the user query input.

6. The information handling system of claim 1, wherein the capability intent values are generated by execution of code instructions for a text embedding algorithm and mathematically represent semantic meaning for words or phrases within the natural language descriptions for the capabilities for correlation with the query intent input value generated from the user query input.

7. The information handling system of claim 1, wherein the TF-IDF weighted cosine semantic similarity search determines a degree of angular similarity between vector values for the capability intent values and the query input intent value that mathematically represent one or more phrases within the natural language descriptions for the capabilities and natural language of the user query input.

8. A method for executing computer readable code instructions of an on the box (OTB) artificial intelligence (AI) productivity tool at an information handling system to respond to a user query input comprising:

storing, in a natural language capabilities database memory, the natural language descriptions of capabilities for a plurality of AI productivity tool-enable software applications executing on the information handling system and capability intent values generated from the natural language descriptions in capability nodes in a capabilities decision tree with each capability node grouped under a branch of a plurality of branches in the capabilities decision tree according to logical topics in hierarchical parent-child relationships, wherein metadata for each capability node identifies a child capability node or parent capability node of the capability node;

generating, via a hardware processor executing machine readable code instructions of the OTB AI productivity tool, a query input intent value from a user query input received via text or audio requesting a response by one of the plurality of AI productivity tool-enableable software applications;

performing, via a hardware processor, a text frequency-inverted document frequency (TF-IDF) weighted semantic similarity search comparing the capability intent values of each of the capability nodes in the capabilities decision tree in a semantic similarity search comparison weighted by a TF-IDF comparison between the user query input and the natural language descriptions of the capability nodes in the capabilities decision tree to identify a best match childless capability node among the childless capability nodes having a highest TF-IDF weighted semantic similarity search score with the query input intent value; and executing computer-readable program code instructions to perform a best match capability associated with the best match childless capability node of a first AI productivity tool-enableable software application in response to the user query input.

9. The method of claim 8, wherein the TF-IDF weighted semantic similarity search includes a parent score and TF-IDF weighted semantic similarity search that generates, for each child capability node in the branch, a parent and TF-IDF weighted similarity search score that is weighted by the TF-IDF weighted similarity search score determined for the parent capability node of that child capability node.

10. The method of claim 8, wherein the capability intent values are generated by execution of code instructions for a text embedding algorithm and mathematically represent semantic meaning for words or phrases within the natural language descriptions for the capabilities for correlation with the query input intent value generated from natural language of the user query input.

11. The method of claim 8, wherein computer-readable program code instructions of a latent semantic analysis text embedding algorithm are executed via the hardware processor for generating the capability intent values and the query input intent value.

12. The method of claim 8 further comprising:

executing computer-readable program code instructions of the first AI productivity tool-enablable software application, via the hardware processor, to perform the best match capability to provide responsive output via text or audio to the user query input.

13. The method of claim 8, wherein a cosine semantic search machine learning algorithm generates the TF-IDF weighted semantic similarity search score for each of the capabilities by performing a cosine semantic similarity search comparing a degree of angular similarity between vector values for the capability intent values in capability nodes of the capabilities decision tree with the query input intent value.

14. The method of claim 8 further comprising:

executing computer-readable program code instructions of the first AI productivity tool-enablable software application, via the hardware processor, to perform the best match capability to optimize settings for a hardware component of the information handling system.

15. An information handling system executing computer readable code instructions for an on the box (OTB) artificial intelligence (AI) productivity tool comprising:

a natural language capabilities database memory to store natural language descriptions of capabilities associated with each of a plurality of AI productivity tool-enablable software applications executing on the information handling system, capability intent values generated from the natural language descriptions for each capability, and a capability identification in capability nodes in a capabilities decision tree with each capability node grouped under a branch of a plurality of branches in the capabilities decision tree according to logical topics in hierarchical parent-child relationships, wherein metadata for each capability node identifies a child capability node or parent capability node of the capability node;

the hardware processor executing computer-readable program code instructions to generate a query input intent value from a user query input received via text or audio requesting response by one of the plurality of AI productivity tool-enableable software applications;

the hardware processor executing computer-readable code instructions for performing a cosine semantic similarity search comparing the capability intent values in the capabilities decision tree to the query input intent value and a text frequency-inverted document frequency (TF-IDF) comparison between natural language of the user query input and each of the natural language descriptions of capabilities to generate a TF-IDF weighted cosine semantic similarity search score for each capability node; and the hardware processor executing computer-readable program code instructions to perform a TF-IDF weighted cosine semantic similarity search comparing the capability intent values of each of the capability nodes in the capabilities decision tree to identify a best match childless capability node having a highest TF-IDF weighted cosine semantic similarity search score with the query input intent value, where a childless capability node of the branch of the capabilities decision tree has lower level child capability nodes associated with the childless capability node in the branch; and the hardware processor executing computer-readable program code instructions for a first AI productivity tool-enableable software application having the best match childless capability node to execute an associated best match capability in response to the user query input.

16. The information handling system of claim 15, wherein the capability intent values are generated by execution of code instructions for a text embedding algorithm and mathematically represent semantic meaning for words or phrases within the natural language descriptions for the gathered capabilities for correlation with the natural language of the query input intent value generated from the natural language of the user query input.

17. The information handling system of claim 15, wherein the hardware processor executes computer-readable program code instructions of the cosine semantic search machine learning algorithm that compares a degree of angular similarity between vector values for the capability intent values in capability nodes of the capabilities decision tree with the query input intent value a cosine semantic search machine learning algorithm for generating the TF-IDF weighted semantic similarity search score for each of the capabilities.

18. The information handling system of claim 15 further comprising:

the hardware processor executing computer-readable program code instructions of the OTB AI productivity tool to generate capability intent values from the natural language descriptions of the capabilities and storing the capability intent values with the capability nodes.

19. The information handling system of claim 15, wherein the TF-IDF weighted cosine semantic similarity search includes a parent score and TF-IDF weighted cosine semantic similarity search that generates, for each child capability node, a parent and TF-IDF weighted cosine similarity search score that is weighted by the TF-IDF weighted cosine similarity search score determined for the parent capability node for that child capability node.

20. The information handling system of claim 15 further comprising:

the hardware processor executing computer-readable program code instructions of the first AI productivity tool-enablable software application to perform the best match capability to provide hardware component adjustment for a hardware component of the information handling system in response to the user query input.

* * * * *